US010640686B2

(12) United States Patent
Roscoe et al.

(10) Patent No.: US 10,640,686 B2
(45) Date of Patent: *May 5, 2020

(54) CROSSLINKABLE AND CROSSLINKED POLYMERIC MATERIALS

(71) Applicant: 3M INNOVATIVE PROPERTIES COMPANY, St. Paul, MN (US)

(72) Inventors: Stephen B. Roscoe, Woodbury, MN (US); Deepti Gopalakrishnan, Minneapolis, MN (US); Stefan H. Gryska, Woodbury, MN (US); George W. Griesgraber, Eagan, MN (US); Serkan Yurt, St. Paul, MN (US); Duane D. Fansler, Dresser, WI (US); Kevin M. Lewandowski, Inver Grove Heights, MN (US); Joon Chatterjee, Gaithersburg, MD (US); Hae-Seung Harry Lee, Woodbury, MN (US); Babu N. Gaddam, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/471,630

(22) PCT Filed: Dec. 19, 2017

(86) PCT No.: PCT/US2017/067287
§ 371 (c)(1),
(2) Date: Jun. 20, 2019

(87) PCT Pub. No.: WO2018/118905
PCT Pub. Date: Jun. 28, 2018

(65) Prior Publication Data
US 2020/0087547 A1     Mar. 19, 2020

Related U.S. Application Data

(60) Provisional application No. 62/438,245, filed on Dec. 22, 2016.

(51) Int. Cl.
C09J 7/38 (2018.01)
C08F 265/06 (2006.01)
C09J 11/08 (2006.01)

(52) U.S. Cl.
CPC ............ C09J 7/387 (2018.01); C08F 265/06 (2013.01); C09J 11/08 (2013.01); *C09J 2205/102* (2013.01); *C09J 2205/114* (2013.01); *C09J 2451/00* (2013.01)

(58) Field of Classification Search
CPC .. C08F 297/023; C08F 220/10; C08F 220/14; C08F 2/50; C08F 293/055; C08F 2220/182; C08F 2220/281; C08F 2220/1858; C09J 7/38; C09J 11/08; C09J 65/06; C09J 2205/114; C09J 2205/102
See application file for complete search history.

(56) References Cited

U.S. PATENT DOCUMENTS

| | | | |
|---|---|---|---|
| 2,716,633 A | 8/1955 | Engelhardt | |
| 4,181,752 A | 1/1980 | Martens | |
| 4,329,384 A | 5/1982 | Vesley | |
| 4,330,590 A | 5/1982 | Vesley | |
| 4,379,201 A | 4/1983 | Heilmann | |
| 4,391,687 A | 7/1983 | Vesley | |
| 5,097,007 A * | 3/1992 | Himori | C08G 63/6886 525/437 |
| 5,162,444 A * | 11/1992 | Himori | C08F 293/00 522/124 |
| 5,183,917 A * | 2/1993 | Maruyama | C07C 327/22 558/251 |
| 5,190,989 A * | 3/1993 | Himori | C08F 293/00 522/176 |
| 5,314,962 A * | 5/1994 | Otsu | C08F 293/00 522/116 |

(Continued)

FOREIGN PATENT DOCUMENTS

| | | |
|---|---|---|
| EP | 0286376 | 10/1988 |
| EP | 0349270 | 1/1990 |

(Continued)

OTHER PUBLICATIONS

Mattioni, "Prediction of Glass Transition Temperatures from Monomer and Repeat Unit Structure Using Computational Neural Networks", Journal of Chemical Information and Computer Sciences, Mar. 2002, vol. 42, No. 2, pp. 232-240.

O'Brien, "Facile, Versatile and Cost Effective Route to Branched Vinyl Polymers", Polymer, Jul. 2000, vol. 41, No. 15, pp. 6027-6031.

O'Reilly, "Mild and Facile Synthesis of Multi-Functional RAFT Chain Transfer Agents", Polymer, Oct. 2009, vol. 1, No. 1, pp. 3-15.

Otsu, "Role of initiator-transfer agent-terminator (iniferter) in radical polymerizations: Polymer design by organic disulfides as iniferters", Macromolecular Rapid Communications, Feb. 1982, vol. 3, No. 2, pp. 127-132.

(Continued)

*Primary Examiner* — Sanza L. McClendon
(74) *Attorney, Agent, or Firm* — Jean A. Lown

(57) ABSTRACT

Crosslinkable compositions are provided that contain a) a polymeric material having at least two terminal dithiocarbamate groups or two terminal dithiocarbonate groups and b) a monomer composition that includes at least a crosslinking monomer having two or more ethylenically unsaturated groups. The polymeric materials in the crosslinkable compositions undergo chain extension and crosslinking reactions when exposed to actinic radiation in the ultraviolet region of the electromagnetic spectrum. Additionally, crosslinked compositions, articles that contain the crosslinkable compositions or the crosslinked compositions, and methods of making the articles are provided.

15 Claims, No Drawings

(56) References Cited

U.S. PATENT DOCUMENTS

| | | | |
|---|---|---|---|
| 5,506,279 A | | 4/1996 | Babu |
| 5,679,762 A * | | 10/1997 | Yoshida ................ C08F 293/00 528/364 |
| 5,773,485 A | | 6/1998 | Bennett |
| 5,902,836 A | | 5/1999 | Bennett |
| 6,953,649 B2 * | | 10/2005 | Prat .................... C08F 293/005 430/157 |
| 8,507,612 B2 | | 8/2013 | Zhu et al. |
| 10,400,055 B2 * | | 9/2019 | Griesgraber .............. C08F 2/48 |
| 2005/0159581 A1 * | | 7/2005 | Vanderzande .......... C08F 28/02 528/391 |
| 2013/0165606 A1 | | 6/2013 | Prenzel |
| 2014/0288242 A1 | | 9/2014 | Prenzel |
| 2014/0329971 A1 | | 11/2014 | Prenzel |
| 2016/0340463 A1 * | | 11/2016 | Xu ......................... C08F 20/14 |

FOREIGN PATENT DOCUMENTS

| WO | WO 1993-020164 | 10/1993 |
|---|---|---|
| WO | WO 2018-013330 | 1/2018 |

OTHER PUBLICATIONS

Taton, "Handbook of RAFT Polymerization", 373-421, (2010).
International Search Report for PCT International Application No. PCT/US2017/067287, dated Mar. 6, 2018, 4 pages.

* cited by examiner

CROSSLINKABLE AND CROSSLINKED POLYMERIC MATERIALS

CROSS REFERENCE TO RELATED APPLICATION

This application is a national stage filing under 35 U.S. C. 371 of PCT/US2017/067287, filed Dec. 19, 2017, which claims the benefit of U.S. Provisional Patent Application No. 62/438245, filed Dec. 22, 2016, the disclosure of which is incorporated by reference in their entirety.

TECHNICAL FIELD

Crosslinkable polymeric materials, crosslinked polymeric materials, articles containing the crosslinkable polymeric materials or crosslinked polymeric materials, and methods of making the articles are described.

BACKGROUND

The performance characteristics of polymeric materials are determined not only by their composition but also by their molecular architecture. For copolymers, various properties such as melt viscosity, glass transition temperature, and modulus are often a function of the distribution of the different monomeric units along the polymeric chain. Conventional radical polymerization methods have limited utility in synthesizing polymers with precise architectural and structural characteristics.

Controlled radical polymerization methods have been developed that allow the preparation of polymers with well-defined molecular weight, polydispersity, topology, composition, and microstructure. These methods are based on the use of special polymerization mediators, which temporarily and reversibly transform propagating radicals into dormant and/or stable species. These reversible transformations are typically either accomplished by reversible deactivation or by reversible chain transfer. Some of the methods that involve controlled radical polymerization through reversible transformations include iniferter methods, nitroxide mediated polymerization (NMP) methods, atom transfer polymerization (ATRP) methods, and reversible addition-fragmentation (RAFT) methods.

The terms "iniferter" and "photoiniferters" refer to molecules that can act as an initiator, chain transfer agent, and terminator. Various iniferters were discussed in Otsu et al., Makromol. Chem., Rapid Commun., 3, 127-132 (1982). The compound p-xylene bis(N,N-diethyldithiocarbamate) (XDC) has been used to form various acrylic-based block copolymers such as those described in European Patent Applications 0286376 A2 (Otsu et al.) and 0349270 A2 (Mahfuza et al.).

Some polymeric materials have been formed by applying a layer of a crosslinkable composition to the surface of a substrate. The crosslinkable composition can contain a prepolymer plus additional monomers and a crosslinking agent. Crosslinked compositions can be prepared by exposing the crosslinkable composition to actinic radiation such as ultraviolet radiation. Such polymeric materials and processes are described in U.S. Pat. No. 4,181,752 (Martens et al.), U.S. Pat. No. 4,330,590 (Vesley), U.S. Pat. No. 4,329,384 (Vesley et al.), U.S. Pat. No. 4,379,201 (Heilmann et al.), U.S. Pat. No. 5,506,279 (Babu et al.), U.S. Pat. No. 5,773,836 (Bennett et al.), and U.S. Pat. No. 5,773,485 (Bennett et al.).

SUMMARY

Crosslinkable compositions are provided that contain a) a polymeric material having at least two terminal dithiocarbamate groups or two terminal dithiocarbonate groups and b) a monomer composition that includes at least a crosslinking monomer having at least two ethylenically unsaturated groups. The polymeric materials in the crosslinkable compositions undergo chain extension and crosslinking reactions when exposed to actinic radiation in the ultraviolet region of the electromagnetic spectrum. Additionally, crosslinked compositions, articles that contain the crosslinkable compositions or the crosslinked compositions, and methods of making the articles are provided.

In a first aspect, a crosslinkable composition is provided that contains a) a polymeric material of Formula (I)

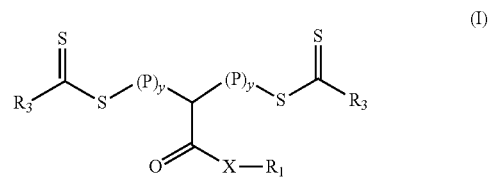

and b) a second monomer composition that is miscible with the polymeric material of Formula (I) and that contains a crosslinking monomer having at least two ethylenically unsaturated groups. In Formula (I), the group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where group $R_2$ is hydrogen, alkyl, fluorinated alkyl, aryl, aralkyl, or substituted aryl (e.g., an aryl substituted with at least one alkyl and/or alkoxy). Each $R_3$ is an alkoxy, fluorinated alkoxy, or —$N(R_4)_2$ where each $R_4$ is an alkyl, fluorinated alkyl, or together with the nitrogen to which they are both attached form a heterocyclic ring. Each P is a polymeric block that comprises a polymerized product of a first monomer composition (there is usually a different first monomer composition for each of the different blocks) comprising at least one monomer having a single ethylenically unsaturated group and the variable y is an integer in a range of 1 to 5.

In a second aspect, a crosslinked composition is provided. The crosslinked composition includes the polymerized product of a crosslinkable composition. The crosslinkable composition is the same as described above.

In a third aspect, an article is provided that includes a first substrate and a crosslinkable composition layer adjacent to the substrate. The crosslinkable composition layer contains the crosslinkable composition described above.

In a fourth aspect, an article is provided that includes a first substrate and a crosslinked composition layer adjacent to the substrate. The crosslinked composition layer contains the crosslinked composition described above.

In a fifth aspect, a method of making an article is provided. The method includes providing a first substrate and positioning a layer of a crosslinkable composition adjacent to the first substrate. The crosslinkable composition is the same as described above. The method further includes exposing the layer of crosslinkable composition to ultraviolet radiation to form a layer of crosslinked composition.

DETAILED DESCRIPTION

Crosslinkable polymeric materials, crosslinked polymeric materials, articles containing the crosslinkable polymeric materials or crosslinked polymeric materials, and methods of making the articles are provided. More particularly, the crosslinkable composition contains a) a polymeric material, which has terminal dithiocarbamate or dithiocarbonate groups, and b) a monomer composition containing at least a crosslinking monomer having two or more ethylenically unsaturated groups. When the crosslinkable composition is exposed to actinic radiation in the ultraviolet region of the electromagnetic spectrum, the polymeric material undergoes chain extension and crosslinking reactions. The reactions to form the crosslinked polymeric material are controlled polymerization reactions.

The terms "a", "an", and "the" are used interchangeably with "at least one" to mean one or more of the elements being described.

The term "and/or" means either or both. For example "A and/or B" means only A, only B, or both A and B.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "alkyl" refers to a monovalent group that is a radical of an alkane. The alkyl group can have 1 to 32 carbon atoms, 1 to 20 carbon atoms, 1 to 12 carbon atoms, or 1 to 6 carbon atoms. The alkyl can be linear, branched, cyclic, or a combination thereof. A linear alkyl has at least one carbon atoms while a cyclic or branched alkyl has at least 3 carbon atoms. In some embodiments, if there are greater than 12 carbon atoms, the alkyl is branched.

The term "fluorinated alkyl" refers to an alkyl group substituted with at least one fluorine atom (i.e., at least one hydrogen atom is replaced with a fluorine atom). If all of the hydrogen atoms are replaced with fluorine atoms, the fluorinated alkyl is a "perfluoroalkyl".

The term "alkoxy" refers to a monovalent group of formula —$OR^a$ where $R^a$ is an alkyl as defined above.

The term "fluorinated alkoxy" refers to an alkoxy group substituted with at least one fluorine atom.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms.

The term "substituted aryl" refers to an aryl group substituted with at least one alkyl group, substituted with at least one alkoxy group, or substituted with at least one alkyl group plus at least one alkoxy group. The substituted aryl group contains 6 to 40 carbon atoms. The substituted aryl group often contains an aryl group having 5 to 20 carbon atoms and an alkyl group and/or alkoxy group each having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "(meth)acryloyl" refers to a group of formula $CH_2=CHR^b—(CO)—$ where $R^b$ is hydrogen or methyl and the group —(CO)— refers to a carbonyl group.

The term "(meth)acrylate" refers to an acrylate, a methacrylate, or both. Likewise, the term "(meth)acrylamide" refers to an acrylamide, a methacrylamide, or both and the term "(meth)acrylic acid" refers to acrylic acid, methacrylic acid, or both.

The terms "in a range of" or "in the range of" are used interchangeably to refer to all values within the range plus the endpoints of the range.

The crosslinked composition is formed by exposing a crosslinkable composition to actinic radiation that includes ultraviolet radiation. The crosslinkable composition contains a) a polymeric material of Formula (I)

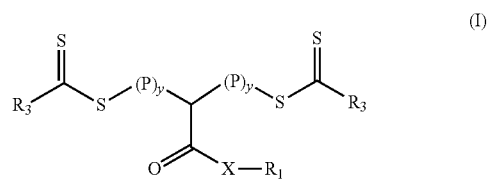

and b) a second monomer composition that is miscible with the polymeric material of Formula (I). The second monomer composition includes at least a crosslinking monomer having two or more ethylenically unsaturated groups. As used with respect to the second monomer composition and the polymeric material of Formula (I), the term "miscible" means that a mixture of the polymeric material of Formula (I) and the second monomer composition is a single phase.

In Formula (I), the group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where group $R_2$ is hydrogen, alkyl, fluorinated alkyl, aryl, aralkyl, or substituted aryl (e.g., an aryl substituted with at least one alkyl and/or alkoxy). Each $R_3$ is an alkoxy, fluorinated alkoxy, or —$N(R_4)_2$ where each $R_4$ is an alkyl, fluorinated alkyl, or together with the nitrogen to which they are both attached form a heterocyclic ring. Each P is a polymeric block that comprises a polymerized product of a first monomer composition comprising at least one monomer having a single ethylenically unsaturated group and the variable y is an integer in a range of 1 to 5.

Group $R_1$ in Formula (I) can be hydrogen, alkyl, fluorinated alkyl, aryl, aralkyl, or substituted aryl. Suitable alkyl and fluorinated alkyl groups typically have at least 1 carbon atom, at least 2 carbon atoms, at least 3 carbon atoms, or at least 4 carbon atoms and can have up to 32 carbon atoms, up to 20 carbon atoms, up to 18 carbon atoms, up to 16 carbon atoms, up to 12 carbon atoms, or up to 10 carbon atoms. Some example alkyl and fluorinated alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkyl groups can have one to all of the hydrogen atoms replaced with fluorine atoms. In some example fluorinated alkyl groups, all of the hydrogen atoms are replaced with fluorine and the fluorinated alkyl is a perfluoroalkyl. Suitable aryl groups often have 5 to 20 carbon atoms or 6 to 10 carbon atoms. In some embodiments the aryl is phenyl. Suitable aralkyl and substituted aryl groups often have 6 to 40 carbon atoms, 7 to 20 carbon atoms, or 7 to 10 carbon atoms. Some example substituted aryl groups are phenyl substituted with an alkyl, an alkoxy, or both with each alkyl or alkoxy group having 1 to 10 carbon atoms, 1 to 6 carbon atoms, or 1 to 4 carbon atoms. Some example aralkyl group have an alkyl group has 1 to 10 carbon atoms, 1 to 6 carbon atoms, or 1 to 4 carbon atoms substituted with phenyl. In many embodiments, $R_1$ is an alkyl or fluorinated alkyl.

Group X in Formula (I) is either oxy or —$NR_2$— where $R_2$ can be hydrogen, alkyl, fluorinated alkyl, aryl, aralkyl, or substituted aryl. Suitable alkyl, fluorinated alkyl, aryl, aralkyl, and substituted aryl $R_2$ groups are the same as those described above for group $R_1$. In some embodiments, $R_2$ is hydrogen, alkyl, or fluorinated alkyl. In other embodiments, $R_2$ is hydrogen or alkyl. In still other embodiments, $R_2$ is hydrogen. The polymeric material of Formula (I) has a pendant group —(CO)—O—$R_1$ or —(CO)—$NR_2$—$R_1$. The pendant group can be selected, if desired, to be similar or identical to pendant groups of the monomeric units in the polymeric block P.

In some embodiments of Formula (I), group $R_3$ is an alkoxy or fluorinated alkoxy. Suitable alkoxy and fluorinated alkoxy groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy and fluorinated alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkoxy groups can have one to all of the hydrogen atoms replaced with fluorine atoms. In some embodiments, all of the hydrogen atoms are replaced with fluorine atoms.

In other embodiments of Formula (I), group $R_3$ is of formula —$N(R_4)_2$ where each $R_4$ is an alkyl, fluorinated alkyl, or together with the nitrogen to which they are both attached form a heterocyclic ring. Suitable alkyl and fluorinated alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and fluorinated alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkyl groups can have one to all of the hydrogen atoms replaced with fluorine atoms. When the formula —$N(R_4)_2$ forms a heterocyclic ring, the heterocyclic ring typically has a first ring structure with 5 to 7 ring members and with either 1 or 2 heteroatoms in the ring. If there is one heteroatom in the first ring structure, the heteroatom is nitrogen. If there are two heteroatoms in the first ring structure, one heteroatom is nitrogen and the other heteroatom is selected from nitrogen, oxygen, and sulfur. The first ring structure optionally can be fused to additional ring structures. The additional ring structures can be heterocyclic or carbocyclic. The first ring structure or any additional ring structures can be saturated or unsaturated (e.g., partially or fully unsaturated). If there is an additional heterocyclic ring structure, it typically has 5 or 6 ring members and 1 or 2 heteroatoms selected from nitrogen, oxygen, and sulfur. In many embodiments, the heterocyclic ring has a single ring structure with 5 or 6 ring members and with either 1 or 2 heteroatoms in the ring. Examples of heterocyclic rings include, but are not limited to, morpholino, thiomorpholino, pyrrolidinyl, piperidinyl, homopiperidinyl, indolyl, carbazolyl, and pyrazolyl.

In some specific embodiments of Formula (I), $R_3$ is an alkoxy group or a group of formula —$N(R_4)_2$ where each $R_4$ is an alkyl.

Each polymeric block P in Formula (I) is the polymerized product of a monomer composition containing at least one monomer having a single ethylenically unsaturated group. Any monomer having a single ethylenically unsaturated group can be used based on the desired properties of the resulting polymeric material. In some embodiments, all of the monomers used to form any polymeric block P have a single (meth)acryloyl group. In other embodiments, all of the monomers used to form any polymeric block P have a single ethylenically unsaturated group that is not a (meth)acryloyl group. In still other embodiments, all of the monomers used to form any polymeric block P have a single ethylenically unsaturated group and some, but not all, of the ethylenically unsaturated groups are (meth)acryloyl groups. Each polymeric block can be a homopolymer or a copolymer. Any monomer can be used alone or in combination with other monomers to form each polymeric block.

Suitable monomers with a single (meth)acryloyl group that can be used to form the polymeric material of Formula (I) include, but are not limited to, alkyl (meth)acrylates, fluorinated alkyl (meth)acrylates, aryl (meth)acrylates, aralkyl (meth)acrylates, substituted aryl (meth)acrylates, (meth)acrylic acid, (meth)acrylamide, N-alkyl (meth)acrylamide, N,N-dialkyl (meth)acrylamide, N-alkylaminoalkyl (meth)acrylate, N,N-dialkylaminoalkyl (meth)acrylate, N-alkylaminoalkyl (meth)acrylamide, N,N-dialkylaminoalkyl (meth)acrylamide, hydroxy-substituted alkyl (meth)acrylates, hydroxy-substituted alkyl (meth)acrylamides, alkoxylated alkyl (meth)acrylate, acid-substituted alkyl (meth)acrylates, acid-substituted alkyl (meth)acrylamides, glycidyl-containing (meth)acrylates, aminosulfonyl-containing (meth)acrylates, and mixtures thereof.

In other embodiments, the reaction mixture used to form any block P in the polymeric material of Formula (I) includes a monomer composition containing a monomer having a single ethylenically unsaturated group that is not a (meth)acryloyl group. Suitable such monomers include, but are not limited to, N-vinylpyrrolidone, N-vinylcaprolactam, vinyl acetate, vinyl methyl ether, vinyl-2-ethylhexanoate, vinyl neodecanoate, styrene, isoprene, butadiene, vinyl dimethylazlactone (VDM), isopropenyl dimethylazlactone (IDM), and vinyl oxazole, and the like. The number (y) of polymeric blocks (P) in Formula (I) can vary from 1 to 5. In some embodiments of Formula (I), the variable y is equal to 1 and the resulting polymeric material is of Formula (II).

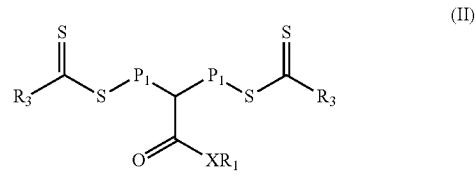

In Formula (II), $P_1$ is a first polymeric block that is a polymerized product of a monomer composition 1A (i.e., first monomer composition 1A) containing at least one monomer having a single ethylenically unsaturated group. $P_1$ can be a homopolymer or a copolymer. If $P_1$ is a copolymer, it is typically a random copolymer. Groups $R_1$, $R_3$, and X are the same as defined for Formula (I). The polymeric material of Formula (II) can be considered as having a single polymeric block $P_1$ and the polymeric block has a pendant group —(CO)—$XR_1$. That is, there is a divalent group of formula —C[(CO)—$XR_1$]H-between two monomeric units within polymeric block $P_1$.

In other embodiments of Formula (I), y is equal to 2 and the resulting polymeric material is of Formula (III).

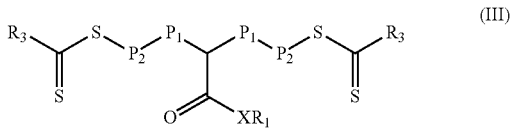

(III)

In Formula (III), $P_1$ is a first polymeric block that is a polymerized product of a monomer composition 1A containing at least one monomer having a single ethylenically unsaturated group. $P_2$ is a second polymeric block that is a polymerized product of a monomer composition 1B containing at least one monomer having a single ethylenically unsaturated group. The composition of the second polymeric block $P_2$ is different than the composition of the first polymeric block $P_1$. Stated differently the monomer composition 1B is typically different than monomer composition 1A. Groups $R_1$, $R_3$, and X are the same as defined for Formula (I). Each block $P_1$ and $P_2$ can be a homopolymer or a copolymer. If either block is a copolymer, it is typically a random copolymer. The polymeric material of Formula (III) can be referred to as a triblock with two $P_2$ blocks separated by a $P_1$ block having a pendant group —(CO)—$XR_1$. That is, there is a divalent group of formula —C[(CO)—$XR_1$]H— between two monomeric units within polymeric block $P_1$.

In still other embodiments of Formula (I), y is equal to 3 and the resulting polymeric material is of Formula (IV).

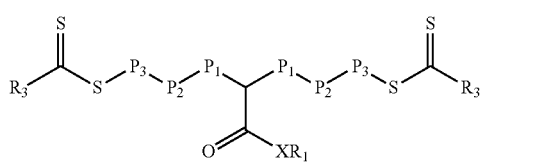

(IV)

In Formula (IV), $P_1$ is a first polymeric block that is a polymerized product of a monomer composition 1A containing at least one monomer having a single ethylenically unsaturated group. $P_2$ is a second polymeric block that is a polymerized product of a monomer composition 1B containing at least one monomer having a single ethylenically unsaturated group. $P_3$ is a third polymeric block that is a polymerized product of a monomer composition 1C containing at least one monomer having a single ethylenically unsaturated group. The composition of the second polymeric block $P_2$ is different than the composition of the first polymeric block $P_1$ and different than the composition of the third polymeric block $P_3$. The composition of the first polymeric block $P_1$ can be the same or different than the composition of the third polymeric block $P_3$. Stated differently, monomer composition 1A is different than monomer composition 1B and monomer composition 1B is different than monomer composition 1C. Monomer composition 1A can be the same or different than monomer composition 1C. Groups $R_1$, $R_3$, and X are the same as defined for Formula (I). Each block $P_1$, $P_2$, and $P_3$ can be a homopolymer or a copolymer. If any block is a copolymer, it is typically a random copolymer. The polymeric material of Formula (IV) can be referred to as a pentablock with two $P_3$ blocks plus two $P_2$ blocks separated by a $P_1$ block having a pendant group —(CO)—$XR_1$. That is, there is a divalent group of formula —C[(CO)—$XR_1$]H-between two monomeric units within polymeric block $P_1$.

Each polymeric block (e.g., P, $P_1$, $P_2$, or $P_3$) can have any desired molecular weight. The molecular weight of each block can be the same or different than any other polymeric block. In some embodiments, the weight average molecular weight of any polymeric block is at least 1,000 Daltons, at least 2,000 Daltons, at least 5,000 Daltons, at least 10,000 Daltons, at least 20,000 Daltons, at least 50,000 Daltons, or at least 100,000 Daltons. The weight average molecular weight of any polymeric block can be up to 1 million Daltons or even higher, up to 750,000 Daltons, up to 500,000 Daltons, up to 200,000 Daltons, or up to 100,000 Daltons. In some embodiments the polymeric material of Formula (I) has an overall weight average molecular weight in a range of 10,000 Daltons to 5 million Daltons, in a range of 10,000 Daltons to 3 million Daltons, or in a range of 10,000 Daltons to 1 million Daltons.

The polymeric materials of Formulas (I) (including those of Formula (II) to (IV)) are prepared by reacting a monomer composition containing at least one monomer having a single ethylenically unsaturated group in the presence of both a photoinitiator of Formula (V)

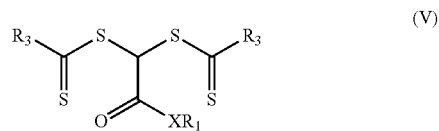

(V)

and actinic radiation (e.g., typically actinic radiation in the ultraviolet region of the electromagnetic spectrum). In Formula (V), groups $R_1$, $R_3$, and X are the same as described for Formula (I) above.

The compounds of Formula (V) can be formed using any suitable method. One such method is shown in Reaction Scheme A.

Reaction Scheme A

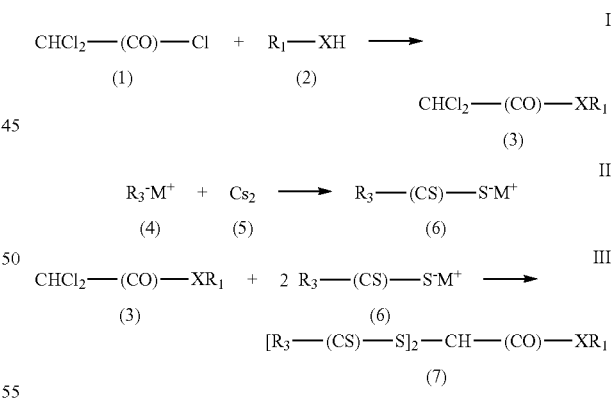

In this reaction scheme, dichloroacetyl chloride (compound (1)) is reacted (Reaction I) with a compound of formula $R_1$—XH (compound (2)), which is an alcohol ($R_1$—OH) or an amine ($R_1$—$NR_2H$). Reaction I often is conducted in the presence of a base such as, for example, trimethylamine and a catalyst such as, for example, pyridine or dimethylaminopyridine. Any organic solvent that is present is usually an aprotic solvent such as methylene chloride or tetrahydrofuran. The product of Reaction I is compound (3) of formula $CHCl_2$—(CO)—$XR_1$. Compound (3) is reacted (Reaction III) with compound (6), which can be formed by the reaction (Reaction II) of a compound of formula $R_3^-M^+$ (compound (4)) with carbon disulfide (5). Compound (4) is a salt of an alkoxide or of an amine where $M^+$ is usually an alkali metal ion, a tetralkyl ammonium ion, a trialkyl ammonium ion, or a dialkylammonium ion. The reaction (Reaction III) of compound (3) with compound (6) is typically conducted at temperatures between about 0° C. and about 80° C. in the presence of an organic solvent such as acetone, acetonitrile, or an alcohol.

In some examples of Reaction Scheme A, commercially available compounds of formula $CHCl_2—(CO)—XR_1$, which is compound (3), are reacted with commercially available compounds of formula $R_3—(CS)—S^-M^+$, which is compound (6). Examples of compound (3) include, but are not limited to, methyl dichloroacetate, ethyl dichloroacetate, and butyl dichloroacetate. Examples of compound (6) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the photoinitiator of Formula (V) (i.e., Compound (7) in Reaction Scheme A), X is an oxy group and the photoinitiator is of Formula (V-1).

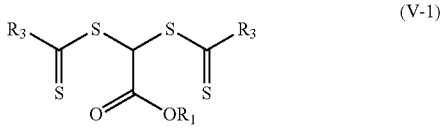

In other embodiments, X is a —$NR_2$— group and the photoinitiator is of Formula (V-2).

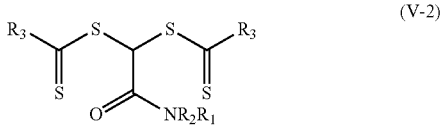

The groups $R_3$ in some embodiments of the photoinitiators of Formulas (V-1) and (V-2) are alkoxy or fluorinated alkoxy groups of formula —$OR_5$. That is, the photoinitiators are of Formula (V-3) and (V-4) respectively where $R_5$ is an alkyl or fluorinated alkyl. These photoinitiators are dithiocarbonate compounds having a single carbon atom between the two thio groups.

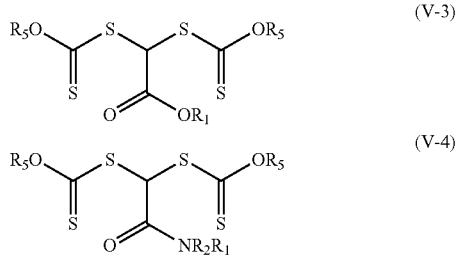

In some specific examples of compounds of Formula (V-3), group —$OR_5$ is an alkoxy and $R_1$ is an alkyl or fluorinated alkyl. Specific examples of compounds of Formula (V-3) include, but are not limited to, methyl 2,2-bis(isopropoxycarbothioylsulfanyl)acetate, ethyl 2,2-bis(isopropoxycarbothioylsulfanyl)acetate, tert-butyl 2,2-bis(isopropoxycarbothioylsulfanyl)acetate, 2-ethylhexyl 2,2-bis(isopropoxycarbothioylsulfanyl)acetate, and 2,2,3,3,4,4,4-heptafluorobutyl 2,2-bis(isopropoxycarbothioylsulfanyl)acetate.

In some specific examples of compounds of Formula (V-4), group —$OR_5$ is alkoxy, $R_1$ is alkyl or fluorinated alkyl, and $R_2$ is hydrogen, alkyl, or fluorinated alkyl. In some more specific embodiments, group —$OR_5$ is alkoxy, $R_1$ is alkyl, and $R_2$ is hydrogen, or alkyl. Specific examples of compounds of Formula (V-4) include, but are not limited to, N,N-dibutyl-2,2-bis(isopropoxycarbothioylsulfanyl)acetamide.

The group $R_3$ in other embodiments of the photoinitiators of Formulas (V-1) and (V-2) are of formula —$N(R_4)_2$ where $R_4$ is the same as defined above for Formula (I). These photoinitiators are of Formula (V-5) and (V-6) respectively. These photoinitiators are dithiocarbamate compounds having a single carbon atom between the two thio groups.

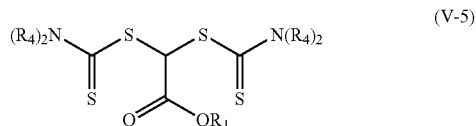

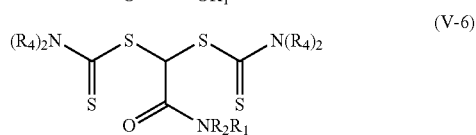

In some specific examples of compounds of Formula (V-5), each $R_4$ is alkyl, $R_1$ is an alkyl or fluorinated alkyl, and $R_2$ is hydrogen, alkyl or fluorinated alkyl. In some more specific examples, each $R_4$ is alkyl, $R_1$ is an alkyl, and $R_2$ is hydrogen or alkyl. Specific examples include, but are not limited to, methyl 2,2-bis(diethylcarbamothioylsulfanyl)acetate, 2-ethylhexyl 2,2-bis(diethylcarbamothioylsulfanyl)acetate, octyl 2,2-bis(diethylcarbamothioylsulfanyl)acetate, methyl-2,2-bis(dimethylcarbamothioylsulfanyl)acetate, and methyl-2,2-bis(pyrrolidine-1-carbothioylsulfanyl)acetate.

In some specific examples of compounds of Formula (V-6), each $R_4$ is an alkyl, $R_1$ is an alkyl or fluorinated alkyl, and $R_2$ is hydrogen, alkyl, or fluorinated alkyl. In some more specific examples, each $R_4$ is alkyl and $R_2$ is hydrogen or alkyl. A specific example includes, but is not limited to, 2,2-bis(dimethylcarbamothioylsulfanyl)-N,N-dimethylacetamide.

Further, the reaction mixtures used to form the polymeric material of Formula (I) typically do not include any other initiator other than the photoinitiator of Formula (V). That is, there is no thermal initiator such as an azo initiator, peroxide initiator, redox initiator, or persulfate initiator. No other photoinitiator other than those of Formula (V) are included in the reaction mixtures.

The photoinitiator of Formula (V) (including those of Formula (V-1) to (V-6)) is mixed with a monomer composition 1A (i.e., first monomer composition 1A) to form a reaction mixture 1A (i.e., first reaction mixture 1A) that is used to form the polymeric materials of Formula (I) (more specifically, the polymeric material is of Formula (II)). Exposing reaction mixture 1A to ultraviolet radiation causes photolysis of the photoinitiator and permits controlled radical polymerization of the monomer composition 1A to form a first polymeric block that includes the carbon atom in the photoinitiator having a pendant —(CO)—X—$R_1$ group. When exposure to ultraviolet radiation is terminated, the first polymerization reaction ceases by reaction with a radical of formula $R_3$—(CS)—S*. The product of reaction mixture 1A is a polymeric material of Formula (II).

More specifically, to prepare a polymeric material having a single polymeric block of Formula (II),

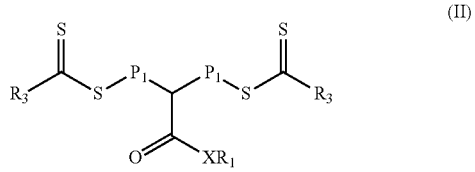

(II)

monomer composition 1A (e.g., a first monomer composition) is mixed with a photoinitiator of Formula (V) to form reaction mixture 1A. Reaction mixture 1A can be neat (i.e., no solvent is present) or can be mixed with a solvent that dissolves both the monomer composition A and the photoinitiator of Formula (V). The solvent can be added, for example, to lower the viscosity of the first reaction mixture. Any solvent that is added is usually selected so that the growing polymeric material is also soluble. In some embodiments, the percent solids in reaction mixture 1A is at least 10 weight percent, at least 20 weight percent, at least 30 weight percent, or at least 40 weight percent and up to 100 weight percent, up to 80 weight percent, or up to 60 weight percent. The amount of solvent added is often selected based on the desired viscosity, particularly the viscosity of the final polymerized material. The desired viscosity is usually sufficiently low so that the final polymeric material can be readily removed from the reactor and/or applied to a substrate.

If a solvent is added, the solvent is often an ester (e.g., ethyl acetate, butyl acetate, and ethylene glycol monomethyl ether acetate), an ether (e.g., dimethyl ether, diethyl ether, ethyl propyl ether, dipropyl ether, methyl t-butyl ether, di-t-butyl ether, dimethoxy ethane, 2-methoxyethanol, diethylene glycol dimethyl ether, dioxane, and tetrahydrofuran), acetonitrile, methylene chloride, an aromatic hydrocarbon (e.g., benzene, xylene, and toluene), or a ketone (e.g., acetone, methyl ethyl ketone, cyclopentanone, and cyclohexanone). Mixtures of solvents can be used. Further, one or more solvents can be combined with water, if miscible. Polymerization of the monomer composition 1A can start at room temperature (e.g., about 20° C. to 25° C.) but can also start, if desired at higher or lower temperatures.

Reaction mixture 1A is exposed to ultraviolet radiation to activate the photoinitiator of Formula (V) and commence controlled radical polymerization of monomer composition 1A. The resulting block $P_1$ can be a homopolymer or a random copolymer having a pendant group —(CO)—$XR_1$ in the polymeric material of Formula (II). The group —(CO)—$XR_1$ is attached to the same single carbon in the photoinitiator of Formula (V) that was used to prepare the polymeric material.

If further polymeric blocks are to be added prior to crosslinking, polymerization of reaction mixture 1A is usually allowed to proceed until greater than 80 weight percent, greater than 85 weight percent, greater than 90 weight percent, greater than 95 weight percent, greater than 98 weight percent, greater than 99 weight percent, or 100 weight percent of the monomers in the monomer composition 1A have undergone controlled radical polymerization. Alternatively, unreacted monomers can be removed from the polymerized material. One of skill in the art is familiar with methods of separating the polymeric material from residual monomers.

If no further polymeric blocks are to be added prior to crosslinking, polymerization of reaction mixture 1A can be allowed to proceed to any desired extent until at least 5 weight percent of the monomer composition 1A has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the monomer composition 1A has undergone controlled radical polymerization. The resulting polymeric material can be combined with a second monomer composition containing a crosslinking monomer having at least two ethylenically unsaturated groups to form the crosslinkable composition.

Polymeric materials having more than one polymeric blocks of Formula (I) can be formed from the polymeric material of Formula (II). A monomer composition 1B can be added to the polymeric material of Formula (II) to form reaction mixture 1B. Upon exposure of reaction mixture 1B to ultraviolet radiation, photolysis occurs again releasing the radical of formula $R_3$—(CS)—S*. Monomer composition 1B can polymerize to form a second polymeric block $P_2$ attached to both ends of the polymeric block $P_1$ in the polymeric material of Formula (II). When exposure to ultraviolet radiation is terminated, the polymerization reaction ceases by reaction with a radical of formula $R_3$—(CS)—S*. The product of the reaction mixture 1B is the polymeric material of Formula (III). This process can be repeated as many times as desired to add more polymeric blocks. If repeated with a third monomer composition, the polymeric material of Formula (IV) is formed.

More specifically, a polymeric material having three polymeric blocks of Formula (III)

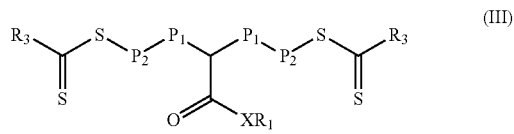

(III)

can be formed from the polymeric material of Formula (II). After 80 weight percent or more (such as at least 90 weight percent, at least 95 weight percent, at least 98 weight percent, at least 99 weight percent, or 100 weight percent) of the monomer composition 1A has undergone controlled radical polymerization, the polymerization reaction is stopped by terminating exposure to actinic radiation (e.g., ultraviolet radiation). A reaction mixture 1B is formed by adding a monomer composition 1B to the reaction product of the reaction mixture 1A. The reaction mixture 1B includes a first polymeric material of Formula (II) plus a monomer composition 1B having at least one monomer with a single ethylenically unsaturated group. It is typically not necessary to add further photoinitiator of Formula (V) to reaction mixture 1B.

Any optional solvent that is included in reaction mixture 1B is usually selected so that it solubilizes the first polymeric material of Formula (II), the photoinitiator of Formula (V), and monomer composition 1B. That is, reaction mixture 1B is typically a single phase. In some embodiments, the percent solids in reaction mixture 1B is selected to have percent solids equal to at least 10 weight percent, at least 20 weight percent, at least 30 weight percent, or at least 40 weight percent and up to 100 weight percent (i.e., no solvent is added), up to 80 weight percent, or up to 60 weight percent. Suitable solvents are the same as those discussed above for the reaction mixture 1A. The amount of solvent added is selected based on the desired viscosity, particularly the viscosity of the final polymerized material. The desired viscosity is usually sufficiently low so that the final polymeric material can be readily removed from the reactor and/or applied to a substrate.

Reaction mixture 1B is exposed to actinic radiation (e.g., ultraviolet radiation) to commence controlled radical polymerization of monomer composition 1B. Each of the two resulting $P_2$ blocks can be a homopolymer or a random copolymer. The two $P_2$ blocks are separated by a $P_1$ block having a pendant group —(CO)—$XR_1$ in the polymeric material of Formula (III). Polymerization of the second monomer composition can occur at room temperature (e.g., about 20° C. to 25° C.) but can also occur, if desired at higher or lower temperatures.

If further polymeric blocks are to be added prior to crosslinking, the polymerization of reaction mixture 1B is usually allowed to proceed until greater than 80 weight percent, greater than 85 weight percent, greater than 90 weight percent, greater than 95 weight percent, greater than 98 weight percent, greater than 99 weight percent, or 100 weight percent of the monomers in the monomer composition 1B have undergone controlled radical polymerization. Alternatively, unreacted monomers can be removed from the polymerized material. One of skill in the art is familiar with methods of separating the polymeric material from residual monomers.

If no further polymeric blocks are to be added prior to crosslinking, polymerization of reaction mixture 1B can be allowed to proceed to any desired extent until at least 5 weight percent of the monomer composition 1B has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the monomer composition 1B has undergone controlled radical polymerization. The resulting polymeric material can be combined with a second monomer composition containing a crosslinking monomer having at least two ethylenically unsaturated groups to form the crosslinkable composition.

The composition of polymeric block $P_2$ is typically different than the composition of polymeric block $P_1$. In some embodiments, the polymeric blocks $P_1$ and $P_2$ have different glass transition temperatures as measured by Differential Scanning Calorimetry. In some embodiments, the difference in the glass transition temperature of polymeric blocks $P_1$ and $P_2$ is at least 40° C., at least 50° C., at least 60° C., at least 70° C., at least 80° C., at least 90° C., or at least 100° C. It is often preferable, however, that the polymeric material of Formula (II) is soluble in reaction mixture 1B containing monomer composition 1B used to form the polymeric material of Formula (III).

In some embodiments, it is desirable to have sharp transitions between the first polymeric block $P_1$ and the second polymeric blocks $P_2$. The transition between two polymeric blocks can be controlled by the percent conversion of the first reaction mixture to the first polymeric block. If the percent conversion is relatively low (e.g., less than 90 percent), then the reaction mixture 1B will include a mixture of the monomer composition 1B plus remaining unreacted monomer composition 1A. That is, some of the monomers from the monomer composition 1A will be in the second polymeric block $P_2$. To minimize the presence of monomeric units of monomer composition 1A in the second polymeric block $P_2$, the percent conversion of the monomer composition 1A should be maximized. A higher percent conversion must be balanced, however, against a longer reaction time. Alternatively, the transition between two polymeric blocks can be controlled by removal of unreacted first monomer from the polymerized material. One of skill in the art is familiar with methods of separating the polymeric material from residual monomers.

A polymeric material having five polymeric blocks of Formula (IV)

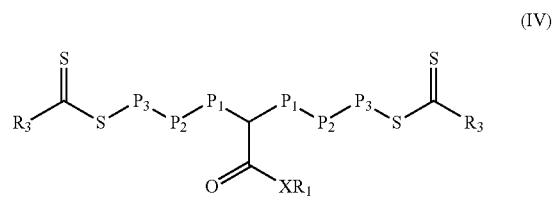

can be formed from the polymeric material of Formula (III). After 80 weight percent or more (such as at least 90 weight percent, at least 95 weight percent, at least 98 weight percent, at least 99 weight percent, or 100 weight percent) of the monomer composition 1B used to form the polymer of Formula (III) has undergone controlled radical polymerization, the polymerization reaction is stopped by terminating exposure to actinic radiation (e.g., ultraviolet radiation). A reaction mixture 1C is formed by adding a monomer composition 1C to the reaction product of the reaction mixture 1B. The reaction mixture 1C includes a second polymeric material of Formula (III) plus a monomer composition 1C having at least one monomer with a single ethylenically unsaturated group.

Any optional solvent that is included in the reaction mixture 1C is usually selected so that it solubilizes the polymeric material of Formula (III), the photoinitiator of Formula (V), and the monomer composition 1C. That is, the reaction mixture 1C is typically a single phase. In some embodiments, the percent solids in the reaction mixture 1C is selected to have percent solids equal to at least 10 weight percent, at least 20 weight percent, at least 30 weight percent, or at least 40 weight percent and up to 100 weight percent (i.e., no solvent is added), up to 80 weight percent, or up to 60 weight percent. Suitable solvents are the same as those discussed above for the reaction mixture 1A. The amount of solvent added is selected based on the desired viscosity, particularly the viscosity of the final polymerized material. The desired viscosity is usually sufficiently low so that the final polymeric material can be readily removed from the reactor and/or applied to a substrate.

The reaction mixture 1C is exposed to ultraviolet radiation to commence controlled radical polymerization of the monomer composition 1C. Each of the two resulting $P_3$ blocks can be a homopolymer or a random copolymer. The two $P_3$ blocks are separated by two $P_2$ blocks and a $P_1$ block having a pendant group —(CO)—$XR_1$ in the polymeric material of Formula (IV). Polymerization of the monomer composition 1C can occur at room temperature (e.g., about 20° C. to 25° C.) but can also occur, if desired at higher or lower temperatures.

If further polymeric blocks are to be added prior to crosslinking, the polymerization of reaction mixture 1C is usually allowed to proceed until greater than 80 weight percent, greater than 85 weight percent, greater than 90 weight percent, greater than 95 weight percent, greater than 98 weight percent, greater than 99 weight percent, or 100 weight percent of the monomers in the monomer composition 1C have undergone controlled radical polymerization. Alternatively, unreacted monomers can be removed from the polymerized material. One of skill in the art is familiar with methods of separating the polymeric material from residual monomers.

If no further polymeric blocks are to be added prior to crosslinking, polymerization of reaction mixture 1C can be allowed to proceed to any desired extent until at least 5 weight percent of the monomer composition 1C has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the monomer composition 1C has undergone controlled radical polymerization. The resulting polymeric material can be combined with a second monomer composition containing a crosslinking monomer having at least two ethylenically unsaturated groups to form the crosslinkable composition.

The composition of polymeric block $P_3$ is typically different than the composition of polymeric block $P_2$, the composition of polymeric block $P_2$ is typically different than the composition of polymeric block $P_1$, and the composition of polymeric block $P_3$ can be the same or different than the composition of polymeric block $P_1$. In some embodiments, the polymeric blocks $P_3$ and $P_2$ have different glass transition temperatures and the polymeric blocks $P_2$ and $P_1$ have different glass transition temperatures as measured by Differential Scanning Calorimetry. In some embodiments, the difference in the glass transition temperature between the polymeric blocks is at least 40° C., at least 50° C., at least 60° C., at least 70° C., at least 80° C., at least 90° C., or at least 100° C.

Additional polymeric blocks can be added to the polymeric material of Formula (IV) to form polymeric materials of Formula (I) where the number of blocks (y) is greater than 3. Each successive precursor polymeric material is added to another monomer composition to form another reaction mixture. The reaction mixture is exposed to actinic radiation such as ultraviolet radiation to form the polymeric material with two additional polymeric blocks as described above.

Adjacent polymeric blocks typically have different compositions, different glass transition temperatures, and different solubility parameters. Because of these differences, a phase separated morphology may result. This phase separation leads to physical crosslinking within the block copolymer and can, for example, increase the cohesive strength of the polymeric material even in the absence of chemical crosslinks.

The amount of the photoinitiator of Formula (V) included in the reaction mixture for any block impacts the weight average molecular weight of the resulting polymeric block. That is, the weight average molecular weight can be controlled based on the amount of photoinitiator added to the reaction mixture. The amount of photoinitiator is typically in a range of 0.001 to 5 weight percent based on the weight of the monomers in the reaction mixture. For comparable reaction conditions, increasing the amount of photoinitiator tends to decrease the weight average molecular weight (as well as the number average molecular weight). The amount of the photoinitiator is typically at least 0.001 weight percent, at least 0.005 weight percent, at least 0.01 weight percent, at least 0.02 weight percent, at least 0.03 weight percent, or at least 0.5 weight percent and can be up to 5 weight percent, up to 4 weight percent, up to 3 weight percent, up to 2 weight percent, or up to 1 weight percent. This amount of photoinitiator often results in the formation of polymeric blocks having a weight average molecular weight in a range of 1,000 to 3,000,000 Daltons or in the range of 1,000 to 1 million Daltons.

The reaction mixtures used to form the polymeric material of Formula (I) typically do not include a chain transfer agent (such as mercaptans and carbon tetrabromide). Chain transfer agents are not needed to control the molecular weight of the resulting polymeric material. Rather, the molecular weight can be varied and controlled through selection of the desired amount of the photoinitiator of Formula (V) and of the desired reaction temperature.

The polymeric material of Formula (I) is combined with a second monomer composition to provide a crosslinkable composition. The second monomer composition contains a crosslinking monomer having at least two ethylenically unsaturated groups. Optionally, the second monomer composition can also include one or more monomers having a single ethylenically unsaturated group. The polymeric material can have a single polymeric block as in Formula (II), three polymeric blocks as in Formula (III), five polymeric blocks as in Formula (IV), or up to (2y-1) polymeric blocks.

The polymeric material of Formula (I) that is combined with the second monomer composition in the crosslinkable composition can have any desired extent of polymerization in the outer block (e.g., polymer block $P_1$ in Formula (II), polymer block $P_2$ in Formula (III), and polymer block $P_3$ in Formula (IV)). In some embodiments, the outer blocks are fully polymerized (e.g., the outer blocks are greater than 99 weight percent polymerized based on the weight of monomers used to form the outer block), nearly fully polymerized (e.g., the outer blocks are at least 80 to 99 weight percent polymerized based on the weight of the monomers used to form the outer blocks), or are partially polymerized (e.g., 5 to 80 weight percent polymerized based on the weight of the monomers used to form the outer blocks). Polymeric material of Formula (I) with partially polymerized outer blocks are referred to as "syrup polymers".

Syrup polymers often includes 5 to 80 weight percent polymeric material of Formula (I) and 20 to 95 weight percent monomer having a single ethylenically unsaturated group based on a total weight of polymerized (i.e., reacted monomers) and polymerizable material (i.e., unreacted monomers). In some embodiments, the syrup polymer contains 10 to 80 weight percent polymeric material of Formula (I) and 20 to 90 weight percent monomer having a single ethylenically unsaturated group, 10 to 70 weight percent polymeric material of Formula (I) and 30 to 90 weight percent monomer having a single ethylenically unsaturated group, 10 to 60 weight percent polymeric material of Formula (I) and 40 to 90 weight percent monomer having a single ethylenically unsaturated group, 10 to 50 weight percent polymeric material of Formula (I) and 50 to 90 weight percent monomer having a single ethylenically unsaturated group, 10 to 40 weight percent polymeric material of Formula (I) and 60 to 90 weight percent monomer having a single ethylenically unsaturated group, 20 to 50 weight percent polymeric material of Formula (I) and 50 to 80 weight percent monomer having a single ethylenically unsaturated group, or 20 to 40 weight percent polymeric material of Formula (I) and 60 to 80 weight percent monomer having a single ethylenically unsaturated group. The amounts are based on a total weight of polymerized and polymerizable material.

If a syrup polymer is used in the crosslinkable composition, the second monomer composition includes a crosslinking monomer plus unreacted monomers that were present when the polymer of Formula (I) was formed. Optionally, the second monomer composition can further include other monomers having a single ethylenically unsaturated group that were not present when the polymer of Formula (I) was formed.

Suitable crosslinking monomers often contain at least two acryloyl groups. Exemplary crosslinking monomers with two acryloyl groups include 1,2-ethanediol diacrylate, 1,3-propanediol diacrylate, 1,4-butanediol diacrylate, 1,4-butanediol diacrylate, 1,6-hexanediol diacrylate (HDDA), 1,9-nonanediol diacrylate, 1,12-dodecanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone. Exemplary crosslinking monomers with three or four (meth)acryloyl groups include, but are not limited to, trimethylolpropane triacrylate (e.g., commercially available under the trade designation TMPTA-N from Surface Specialties, Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinking monomer with five (meth)acryloyl groups includes, but is not limited to, dipentaerythritol pentaacrylate (e.g., commercially available under the trade designation SR-399 from Sartomer).

Regardless of whether the polymeric material of Formula (I) is a syrup polymer, a nearly fully polymerized polymeric material, or a fully polymerized polymeric material, the crosslinkable composition usually includes 0.01 to 20 weight percent crosslinking monomer based on a total weight of polymerized and polymerizable material. In many embodiments, the crosslinkable composition contains at least 0.05 weight percent, at least 0.1 weight percent, at least 0.5 weight percent, or at least 1 weight percent and up to 15 weight percent, up to 10 weight percent, up to 5 weight percent, or up to 1 weight percent crosslinking monomer based on the total weight of polymerized and polymerizable material. Any other monomers included in the crosslinkable composition have a single ethylenically unsaturated group.

Thus, the overall crosslinkable composition contains 5 to 99.99 weight percent polymeric material of Formula (I) and a second monomer composition containing 1) 0.01 to 20 weight percent crosslinking monomer having at least two ethylenically unsaturated groups and 2) 0 to 95 weight percent monomer having a single ethylenically unsaturated group. In some embodiments, the crosslinkable composition contains 10 to 99.99 weight percent polymeric material of Formula (I) and a second monomer composition containing 1) 0.01 to 10 weight percent crosslinking monomer having at least two ethylenically unsaturated groups and 2) 0 to 90 weight percent (0 to 89.99 weight percent) monomers having a single ethylenically unsaturated group. In other embodiments, the crosslinkable composition contains 10 to 80 weight percent polymeric material of Formula (I) and a second monomer composition containing 1) 0.01 to 10 weight percent crosslinking monomer having at least two ethylenically unsaturated groups and 2) 10 to 90 weight percent monomers (10 to 89.99 weight percent) having a single ethylenically unsaturated group. In still other embodiments, the crosslinkable composition contains 10 to 60 weight percent polymeric material of Formula (I) and a second monomer composition containing 1) 0.01 to 10 weight percent crosslinking monomer having at least two ethylenically unsaturated groups and 2) 30 to 90 weight percent (30 to 89.99 weight percent) monomers having a single ethylenically unsaturated group. In yet other embodiments, the crosslinkable composition contains 10 to 40 weight percent polymeric material of Formula (I) and a second monomer composition containing 1) 0.01 to 10 weight percent crosslinking monomer having at least two ethylenically unsaturated groups and 2) 50 to 90 weight percent (50 to 89.99 weight percent) monomers having a single ethylenically unsaturated group. The amounts are based on a total weight of polymerized and polymerizable material in the crosslinkable composition. In a still further embodiment, the crosslinkable composition contains 10 to 40 weight percent polymeric material of Formula (I) and a second monomer composition containing 1) 0.01 to 5 weight percent crosslinking monomer having at least two ethylenically unsaturated groups and 2) 55 to 90 weight percent (55 to 89.99 weight percent) monomers having a single ethylenically unsaturated group. The amounts are based on a total weight of polymerized and polymerizable material.

In some particular embodiments, the polymeric material of Formula (I) is selected so that the final crosslinked composition is suitable for use as a pressure-sensitive adhesive composition. Although the polymeric material included in a pressure-sensitive adhesive can have multiple polymeric blocks, the polymeric material often contains a single polymeric block. That is, the variable y in Formula (I) is equal to 1, which is equivalent to the polymeric material of Formula (II).

For use as a pressure-sensitive adhesive, the monomers selected to form the polymeric material of Formula (II) are those that will result in an elastomeric material. The elastomeric material typically has a glass transition temperature (Tg) that is no greater than 20° C., no greater than 10° C., no greater than 0° C., no greater than −10° C., no greater than −20° C., no greater than −30° C., no greater than −40° C., or no greater than −50° C. The glass transition temperature can be measured using techniques such as Differential Scanning Calorimetry and Dynamic Mechanical Analysis. Alternatively, the glass transition temperature can be estimated using the Fox equation. Lists of glass transition temperatures for homopolymers are available from multiple monomer suppliers such as from BASF Corporation (Houston, Tex., USA), Polyscience, Inc. (Warrington, Pa., USA), and Aldrich (Saint Louis, Mo., USA) as well as in various publications such as, for example, Mattioni et al., *J. Chem. Inf. Comput. Sci.*, 2002, 42, 232-240.

To form an elastomeric polymeric material of Formula (II), the monomeric composition 1A, which is herein also referred to as the first monomer composition, often contains at least one low Tg monomer. As used herein, the term "low Tg monomer" refers to a monomer having a Tg no greater than 20° C. when homopolymerized (i.e., a homopolymer formed from the low Tg monomer has a Tg no greater than 20° C.). Suitable low Tg monomers are often selected from an alkyl (meth)acrylates, heteroalkyl (meth)acrylates, aryl substituted alkyl acrylate, and aryloxy substituted alkyl acrylates.

Example low Tg alkyl (meth)acrylate monomers often are non-tertiary alkyl acrylates but can be an alkyl methacrylates having a linear alkyl group with at least 4 carbon atoms. Specific examples of alkyl (meth)acrylates include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate.

Example low Tg heteroalkyl (meth)acrylate monomers often have at least 3 carbon atoms, at least 4 carbon atoms, or at least 6 carbon atoms and can have up to 30 or more carbon atoms, up to 20 carbon atoms, up to 18 carbon atoms, up to 16 carbon atoms, up to 12 carbon atoms, or up to 10 carbon atoms. Specific examples of heteroalkyl (meth)acrylates include, but are not limited to, 2-ethoxyethyl acrylate, 2-(2-ethoxyethoxy)ethyl acrylate, 2-methoxyethyl (meth)acrylate, and tetrahydrofurfuryl (meth)acrylate.

Exemplary aryl substituted alkyl acrylates or aryloxy substituted alkyl acrylates include, but are not limited to, 2-biphenylhexyl acrylate, benzyl acrylate, 2-phenoxyethyl acrylate, and 2-phenylethyl acrylate.

Monomer composition 1A (i.e. first monomer composition) used in reaction mixture 1A, which is herein also referred to as the "first reaction mixture", for forming a polymeric material of Formula (II) often contains at least 40 weight percent of a low Tg monomer based on a total weight of monomers in monomer composition 1A. In some embodiment, the monomer composition 1A contains at least 45 weight percent, at least 50 weight percent, at least 60 weight percent, at least 65 weight percent, at least 70 weight percent, at least 75 weight percent, or at least 80 weight percent and up to 100 weight percent, up to 99 weight percent, up to 98 weight percent, up to 95 weight percent, up to 90 weight percent, or up to 85 weight percent of the low Tg monomer.

Some monomer compositions 1A can include an optional polar monomer. The polar monomer has an ethylenically unsaturated group plus a polar group such as an acidic groups or a salt thereof, a hydroxyl group, a primary amido group, a secondary amido group, a tertiary amido group, or an amino group. Having a polar monomer often facilitates adherence of the pressure-sensitive adhesive to a variety of substrates.

Exemplary polar monomers with an acidic group include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinyl phosphonic acid, and mixtures thereof. Due to their availability, the acid monomers are often (meth)acrylic acids.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide.

Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The amount of the optional polar monomer is often in a range of 0 to 30 weight percent based on the weight of monomers in monomer composition 1A (i.e., first monomer composition). If present, the amount of polar monomers in the first monomer composition is often at least 0.1 weight percent, at least 0.5 weight percent, or at least 1 weight percent based on the total weight of monomers in monomer composition 1A. The amount can be up to 30 weight percent, up to 25 weight percent, up to 20 weight percent, up to 15 weight percent, up to 10 weight percent, or up to 5 weight percent. For example, the amount is often in a range of 0 to 30 weight percent, in a range of 0 to 20 weight percent, in a range of 0 to 15 weight percent, in a range of 0 to 10 weight percent, in a range of 0 to 5 weight percent, in a range of 0.5 to 15 weight percent, in a range of 1 to 15 weight percent, or in a range of 1 to 10 weight percent based on a total weight of monomers in monomer composition 1A.

Monomer composition 1A (i.e., first monomer composition) can optionally include a high Tg monomer. As used herein, the term "high Tg monomer" refers to a monomer that has a Tg greater than 30° C., greater than 40° C., or greater than 50° C. when homopolymerized (i.e., a homopolymer formed from the monomer has a Tg greater than 30° C., greater than 40° C., or greater than 50° C.). Some suitable high $T_g$ monomers have a single (meth)acryloyl group such as, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, N-octyl (meth)acrylamide, and mixtures thereof. Other suitable high Tg monomers have a single vinyl group that is not a (meth)acryloyl group such as, for example, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof. Vinyl monomers having a group characteristic of polar monomers are considered herein to be polar monomers.

The amount of high Tg monomer used to form the polymeric material of Formula (II) can be up to 50 weight percent or even higher provided that the Tg of the polymeric material is no greater than 20° C. In some embodiments, the amount can be up to 40 weight percent, up to 30 weight percent, up to 20 weight percent, up to 15 weight percent, or up to 10 weight percent. The amount can be at least 1 weight percent, at least 2 weight percent, or at least 5 weight percent. For example, the amount can be in a range of 0 to 50 weight percent, 0 to 40 weight percent, 0 to 30 weight percent, 0 to 20 weight percent, 0 to 10 weight percent, 1 to 30 weight percent, 1 to 20 weight percent, or 1 to 10 weight percent. The amount values are based on a total weight of monomers in monomer composition 1A (i.e., first monomer composition).

Still further, monomer composition 1A (i.e., first monomer composition) can optionally include a vinyl monomer (i.e., a monomer with an ethylenically unsaturated group that is not a (meth)acryloyl group). Examples of optional vinyl monomers include, but are not limited to, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof. The vinyl monomers having a group characteristic of polar monomers are considered herein to be polar monomers.

The amount of the optional vinyl monomer lacking a (meth)acryloyl group is often in a range of 0 to 15 weight percent based on the weight of monomers in monomer composition 1A (i.e. the first monomer composition). If present, the amount of vinyl monomers in the first monomer composition is often at least 0.1 weight percent, 0.2 weight percent, 0.5 weight percent, or 1 weight percent based on the total weight of monomers in the first monomer composition. The amount can be up to 15 weight percent, up to 10 weight percent, or up to 5 weight percent. For example, the amount is often in a range of 0 to 15 weight percent, in a range of 0.1 to 10 weight percent, in a range of 0.5 to 5 weight percent, or in a range of 1 to 5 weight percent based on a total weight of monomers in the first monomer composition.

Overall the elastomeric polymeric material of Formula (II) can be formed from a first monomer composition that includes up to 100 weight percent of the low Tg monomer. In some embodiments, the first monomer composition contains 100 weight percent low Tg monomer based on the total weight of monomers in the first monomer composition. In other embodiments, the first monomer composition contains 40 to 100 weight percent of the low Tg monomer, 0 to 30 weight percent polar monomer, 0 to 50 weight percent high Tg monomer, and 0 to 15 weight percent vinyl monomers not having a (meth)acryloyl group. In still other embodiments, the first monomer composition contains 60 to 100 weight percent of the low Tg monomer, 0 to 20 weight percent polar monomer, 0 to 40 weight percent high Tg monomer, and 0 to 10 weight percent vinyl monomers not having a (meth)acryloyl group. In yet other embodiments, the first monomer composition contains 75 to 100 weight percent of the low Tg monomer, 0 to 10 weight percent polar monomer, 0 to 25 weight percent high Tg monomer, and 0 to 5 weight percent vinyl monomers not having a (meth) acryloyl group.

The resulting elastomeric polymeric material of Formula (II) contains up to 100 weight percent or 100 weight percent low Tg monomer units. The weight percent value is based on the total weight of monomeric units in the polymeric material. In some embodiments, the polymeric material contains 40 to 100 weight percent of the low Tg monomeric units, 0 to 15 weight percent polar monomeric units, 0 to 50 weight percent high Tg monomeric units, and 0 to 15 weight percent vinyl monomeric units. In still other embodiments, the polymer contains 60 to 100 weight percent of the low Tg monomeric units, 0 to 10 weight percent polar monomeric units, 0 to 40 weight percent high Tg monomeric units, and 0 to 10 weight percent vinyl monomeric units. In yet other embodiments, the polymer contains 75 to 100 weight percent of the low Tg monomeric units, 0 to 10 weight percent polar monomeric units, 0 to 25 weight percent high Tg monomeric units, and 0 to 5 weight percent monomeric units.

The weight average molecular weight of the elastomeric polymeric material of Formula (II) is often in a range of 10,000 Da to 1,000,000 Da or even higher. For example, the weight average molecular weight can be at least 20,000 Da, at least 30,000 Da, at least 40,000 Da, or at least 50,000 and can be up to 1,000,000 Da, up to 900,000 Da, up to 800,000 Da, up to 700,000 Da, or up to 600,000 Da.

The elastomeric material of Formula (II) can be a fully polymerized polymeric material (e.g., the outer blocks are greater than 99 weight percent polymerized based on the weight of monomers used to form polymer block $P_1$), a nearly fully polymerized (e.g., the outer blocks are at least 80 to 99 weight percent polymerized polymeric material based on the weight of the monomers used to form polymer block $P_1$), or are partially polymerized (e.g., 5 to 80 weight percent polymerized polymeric material based on the weight of the monomers used to form polymer block $P_1$). The partially polymerized polymeric materials are syrup polymers.

Using a syrup polymer rather than a fully or nearly fully polymerized polymeric material can be advantageous in some embodiments. The photoinitiators of Formula (V) allow the formation of syrup polymers that include polymeric chains with a narrower distribution of molecular weights compared to conventionally prepared syrup polymers. These conventionally prepared syrup polymers often contain a small number of longer chains resulting in syrups with higher viscosities. That is, the viscosity of the syrup polymer can be more easily controlled and adjusted with polymeric materials formed using the photoinitiators of Formula (V).

The elastomeric material of Formula (II) is combined with a second monomer composition containing a crosslinking monomer having at least two ethylenically unsaturated groups. In some embodiments, the only monomer in the second monomer composition is the crosslinking monomer. In other embodiments, the second monomer composition further includes a monomer having a single ethylenically unsaturated group. The single ethylenically unsaturated monomer can be a residual monomer remaining in the syrup polymer or can be additional monomers that were not included in the monomer composition used to form the elastomeric material of Formula (II). Examples of additional monomers are any of those described above.

In addition to the polymeric material of Formula (I) (including elastomeric material of Formula (II)) and the various monomers, the crosslinkable composition can optionally further include a photoinitiator. The initiator can be a photoinitiator of Formula (V), a photoinitiator not of Formula (V) such as a conventionally used photoinitiator for free radical polymerization reactions, or mixtures thereof. Suitable photoinitiator compounds that are not of Formula (V) include, for example, benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(acyl) phenyl phosphine oxides such as bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA). In some embodiments, the photoinitiator is a substituted acetophenone or a bis(acyl)phenyl phosphine oxide.

The amount of any added photoinitiator is often in a range of 0 to 1 weight percent based on a total weight of polymerized and polymerizable material. For example, the amount can be at least 0.01 weight percent, at least 0.02 weight percent, at least 0.05 weight percent, or at least 0.1 weight percent and can be up to 1 weight percent, up to 0.8 weight percent, up to 0.5 weight percent, or up to 0.3 weight percent.

An organic solvent can be added, if desired, to control the viscosity of the crosslinkable composition. In many embodiments, no organic solvent (i.e., the curable composition is free of organic solvent) or only a minimum amount of the organic solvent is added. The amount of organic solvent can be up to 60 weight percent or even higher based on a total weight of the crosslinkable composition. The amount of organic solvent can be up to 50 weight percent, up to 40 weight percent, up to 30 weight percent, up to 20 weight percent, up to 10 weight percent, or up to 5 weight percent. In some embodiments, it is desirable to keep the content of organic solvent as low as possible. Any organic solvent used in the second reaction mixture is typically removed at the completion of the crosslinking reaction. Suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

To form a crosslinked composition, the crosslinkable composition is often applied as a layer to a substrate and then exposed to ultraviolet radiation. Any suitable substrate can be used. Stated differently, an article is provided that includes a first substrate and a crosslinkable composition layer positioned adjacent the first substrate. Any of the crosslinkable composition described above can be used in the crosslinkable composition layer.

The crosslinkable composition layer can be positioned adjacent to the substrate using any suitable process such as, for example, flow coating, dip coating, spray coating, knife coating, die coating, or extrusion. Once positioned adjacent to the substrate, the crosslinkable coating layer is exposed to ultraviolet radiation to react the second monomer composition and form the crosslinkable composition.

The use of polymeric material of Formula (I) in the crosslinkable composition is particularly advantageous due to its active end groups (terminal groups). As with the formation of each block of the polymeric material of Formula (I), upon exposure of the crosslinkable composition to ultraviolet radiation, photolysis occurs releasing the radical of formula $R_3$—(CS)—S*. Monomers in the crosslinkable composition can polymerize to form crosslinked polymeric block attached to each of the outer blocks in the polymeric material of Formula (I). When exposure to ultraviolet radiation is terminated, the polymerization reaction ceases by reaction with a radical of formula $R_3$—(CS)—S*. The product is a crosslinked polymeric material.

When polymeric materials are formed using conventional methods and lack active terminal groups (such as $R_3$—(CS)—S— groups in the polymeric materials of Formula (I)) are combined with a crosslinking monomer having multiple ethylenically unsaturated groups, a second polymeric material forms that is separate from the original polymeric material. The second polymeric material is crosslinked in the presence of the original polymeric material and the result is the formation of a gelled network. The original polymeric material is not involved in the crosslinking reaction and usually is not covalently attached to the second polymeric material in the gelled network.

In contrast, the polymeric material of Formula (I) has terminal $R_3$—(CS)—S— groups. When exposed to ultraviolet radiation, radicals of formula $R_3$—(CS)—S* are released and the original polymeric material undergoes chain extension and crosslinking reactions. There is no additional second polymeric material formed that is separate from the original polymeric material. That is, the original polymeric material itself is involved in the crosslinking reaction.

Decreasing the ratio of terminal groups of formula $R_3$—(CS)—S— to the crosslinking monomer tends to favor crosslinking. If increased branching is desired, however, the ratio of the terminal groups to crosslinking monomer can be increased. That is, the extent of crosslinking can be controlled. The terminal groups can come from the original polymeric material of Formula (I) or from a combination of the original polymeric material of Formula (I) plus added photoinitiator of Formula (V).

The crosslinkable composition can be exposed to ultraviolet radiation having a UVA maximum in a range of 280 to 425 nanometers. Ultraviolet light sources can be of various types. Low light intensity lights such as black lights, generally provide intensities ranging from 0.1 or 0.5 mW/cm$^2$ (milliWatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), black lights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, it is preferable to use lights that emit a narrow spectrum of light in the ultraviolet region of the electromagnetic spectrum. These light sources, which can include LEDs and lasers, can result in the formation of crosslinkable compositions without the need to add conventional photoinitiators prior to the curing process. These light sources can enhance the rate of polymerization while maintaining the reactive nature of the polymeric material.

In other embodiments, where broader wavelength ultraviolet light sources are used such as black lights, conventional photoinitiators may need to be added to the crosslinkable compositions prior to crosslinking.

The crosslinkable composition can be positioned on any suitable substrate to provide an article. The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the crosslinkable composition, crosslinked composition, or both. Such treatments include, for example, application of primer layers, surface modification layer (e.g., corona treatment or surface abrasion), or both.

In some embodiments, the substrate is a release liner. Release liners typically have low affinity for the crosslinkable composition or crosslinked composition. Exemplary release liners can be prepared from paper (e.g., Kraft paper) or other types of polymeric material. Some release liners are coated with an outer layer of a release agent such as a silicone-containing material or a fluorocarbon-containing material.

The crosslinkable composition can be positioned next to a substrate using a roll-to-roll process. That is, the substrate can be moved from a first roll to a second roll in a continuous process. As the substrate moves between the first roll and the second roll, it can be coated with the crosslinkable composition. Such a substrate can be regarded as being a web and the web is often a polymeric material such as those described above. The polymeric web can be unrolled from a first roll, coated with the crosslinkable composition, exposed to ultraviolet radiation for crosslinking, and then rolled onto the second roll.

The crosslinkable composition coating can have any desired thickness that can be effectively crosslinked when exposed to ultraviolet radiation. In many embodiments, the crosslinkable composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the crosslinkable composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

In some embodiments, the crosslinked composition is a pressure-sensitive adhesive. Thus, articles with a layer of the crosslinked composition have a pressure-sensitive adhesive layer and can be used for many applications typical of such articles. The substrate adjacent to the pressure-sensitive layer can be selected depending on the particular application. For example, the substrate can be a sheeting material and the resulting article can provide decorative graphics or can be a reflective product. In other examples, the substrate can be label stock (the resulting article is a label with an adhesive layer), a tape backing (the resulting article is an adhesive tape), or a foam. In yet other examples, the substrate can be a release liner and the resulting article can be a transfer tape. The transfer tape can be used to transfer the pressure-sensitive adhesive layer to another substrate or surface. Other substrates and surface include, for example, a panel (e.g., a metal panel such as an automotive panel) or a glass window.

Some articles are adhesive tapes. The adhesive tapes can be single-sided adhesive tapes with the crosslinkable composition attached to a single side of the tape backing or can be double-sided adhesive tape with a pressure-sensitive adhesive layer on both major surfaces of the tape backing. At least one of the two pressure-sensitive adhesive layers is the crosslinkable composition described above. Double-sided adhesive tapes are often carried on a release liner.

If desired, tackifiers can be added to the crosslinkable composition used to form pressure-sensitive adhesives compositions. Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins); and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired.

Various embodiments are provided that are crosslinkable compositions, crosslinked compositions, articles containing the crosslinkable compositions or the crosslinked compositions, and method of making crosslinked articles are provided.

Embodiment 1A is a crosslinkable composition that contains a) a polymeric material of Formula (I)

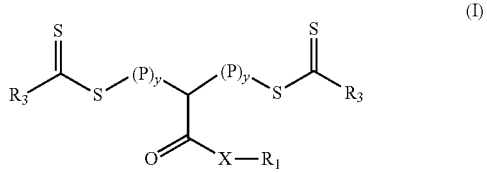

and b) a second monomer composition that is miscible with the polymeric material of Formula (I) and that contains a crosslinking monomer having at least two ethylenically unsaturated groups. In Formula (I), the group $R_1$ is hydrogen, alkyl, fluorinated alkyl, aryl, aralkyl, or substituted aryl (e.g., an aryl substituted with at least one alkyl and/or alkoxy). Group X is oxy or $-NR_2-$ where group $R_2$ is hydrogen, alkyl, fluorinated alkyl, aryl, aralkyl, or substituted aryl (e.g., an aryl substituted with at least one alkyl and/or alkoxy). Each $R_3$ is an alkoxy, fluorinated alkoxy, or $-N(R_4)_2$ where each $R_4$ is an alkyl, fluorinated alkyl, or together with the nitrogen to which they are both attached form a heterocyclic ring. Each P is a polymeric block that comprises a polymerized product of a first monomer composition (there is usually a different first monomer composition for each of the different blocks) comprising at least one monomer having a single ethylenically unsaturated group and the variable y is an integer in a range of 1 to 5.

Embodiment 2A is the crosslinkable composition of embodiment 1A, wherein the polymeric material is of Formula (II).

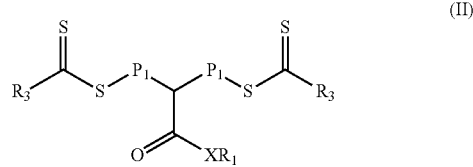

In Formula (II), $P_1$ is a first polymeric block that is a polymerized product of a monomer composition 1A (i.e., first monomer composition 1A) containing at least one monomer having a single ethylenically unsaturated group.

Embodiment 3A is the crosslinkable composition of embodiment 1A or 2A, wherein the polymeric material of Formula (I) (such as Formula (II)) is an elastomeric material.

Embodiment 4A is the crosslinkable composition of any one of embodiments 1A to 3A, wherein the second monomer composition further comprises a monomer having a single ethylenically unsaturated group.

Embodiment 5A is the crosslinkable composition of any one of embodiments 1A to 4A, wherein the crosslinkable composition comprises 1) 5 to 99.99 weight percent polymeric material of Formula (I) and 2) a second monomer composition comprising a) 0.01 to 20 weight percent crosslinking monomer having at least two ethylenically unsaturated groups, and b) 0 to 95 weight percent monomer having a single ethylenically unsaturated group, wherein each amount is based on a total weight of polymerized and polymerizable material.

Embodiment 6A is the crosslinkable composition of any one of embodiments 1A to 5A, wherein the crosslinkable composition comprises 1) 10 to 60 weight percent polymeric material of Formula (I) and 2) a second monomer composition comprising a) 0.01 to 10 weight percent crosslinking monomer having at least two ethylenically unsaturated groups, and b) 30 to 90 weight percent monomer having a single ethylenically unsaturated group, wherein each amount is based on a total weight of polymerized and polymerizable material.

Embodiment 7A is the crosslinkable composition of any one of embodiments 1A to 6A, wherein the crosslinkable composition comprises 1) 10 to 40 weight percent polymeric material of Formula (I) and 2) a second monomer composition comprising a) 0.01 to 5 weight percent crosslinking monomer having at least two ethylenically unsaturated groups, and b) 55 to 90 weight percent monomer having a single ethylenically unsaturated group, wherein each amount is based on a total weight of polymerized and polymerizable material.

Embodiment 8A is the crosslinkable composition of any one of embodiments 2A to 7A, wherein the polymeric material of Formula (II) comprises 40 to 100 weight percent of a low Tg monomeric unit, 0 to 15 weight percent of a polar monomeric unit, 0 to 50 weight percent of a high Tg monomeric unit, and 0 to 15 weight percent vinyl monomeric units based on a total weight of monomeric units.

Embodiment 9A is the crosslinkable composition of any one of embodiments 1A to 8A, wherein the polymeric material of Formula (I) has a weight average molecular weight in a range of 10,000 Daltons to 5 million Daltons.

Embodiment 10A is the crosslinkable composition of any one of embodiments 1A to 9A, wherein the crosslinkable composition further comprises a photoinitiator.

Embodiment 11A is the crosslinkable composition of embodiment 10A, wherein the photoinitiator is of Formula (V).

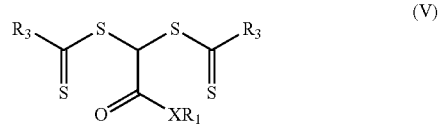

Embodiment 12A is the crosslinkable composition of embodiment 10A, wherein the photoinitiator is not of Formula (V).

Embodiment 13A is the crosslinkable composition of any one of embodiments 1A to 12A, wherein the crosslinking monomer has two or more (meth)acryloyl groups.

Embodiment 14A is the crosslinkable composition of any one of embodiments 1A to 13A, wherein the crosslinkable composition further comprises a tackifier.

Embodiment 1B is a crosslinked composition that includes a polymerized product of a crosslinkable composition of any one of embodiments 1A to 14A.

Embodiment 2B is the crosslinked composition of embodiment 1B is a pressure-sensitive adhesive composition.

Embodiment 1C is an article that includes a first substrate and a crosslinkable composition layer adjacent to the substrate, wherein the crosslinkable composition is of any one of embodiments 1A to 14A.

Embodiment 1D is an article that includes a first substrate and a crosslinked composition layer adjacent to the substrate, wherein the crosslinked composition layer includes a polymerized product of a crosslinkable composition of any one of embodiments 1A to 14A.

Embodiment 2D is the article of embodiment 1D, wherein the crosslinked composition layer is a pressure-sensitive adhesive.

Embodiment 1E is a method of making an article. The method includes providing a first substrate and applying a layer of a crosslinkable composition adjacent to the first substrate. The crosslinkable composition is of any one of embodiments 1A to 14A. The method further includes exposing the layer of crosslinkable composition to actinic radiation to form a layer of crosslinked composition. The actinic radiation includes ultraviolet radiation.

Embodiment 2E is the method of embodiment 1E, wherein the substrate is in the form of a polymeric web.

Embodiment 3E is the method of embodiment 1E or 2E, wherein the actinic radiation is from a light emitting diode.

EXAMPLES

Methods and Materials:

For each syrup polymer, the percent conversion of the monomers to polymer was determined gravimetrically by accurately weighing a sample of the syrup polymer (about 1 g), drying the sample at 100-110° C., and then weighing the dried sample.

Molecular weights were determined by gel permeation chromatography (GPC) with light scattering detection. Prior to testing, the acid sites were methylated using diazomethane.

Theoretical molecular weight was calculated by dividing the mass of monomers by the number of moles of photoinitiator, and then multiplying the result by the percent conversion of monomers to syrup polymer.

Peel Adhesion:

Peel adhesion was measured at an angle of 180 degrees at 23° C. and 50 percent relative humidity (RH) as described in ASTM D3330/D3330M-04 (Reapproved 2010): "Standard Test Method for Peel Adhesion of Pressure-Sensitive Tape". After conditioning for 24 hours at 23° C. and 50 percent relative humidity (RH), tape samples measuring 12.7 millimeters wide and 20.3 centimeters long were cut. The release liner was removed and a tape sample was applied to a glass plate. Prior to tape application, the glass plate was wiped clean first with methyl ethyl ketone (MEK), then with n-heptane, and finally with MEK. The tape sample was rolled twice in each direction using a 2 kilogram rubber roller. Peel adhesion was measured at a platen speed of 305 millimeters/minute over a length of 5.1 centimeters using an IMASS Slip/Peel Tester (Model SP-2000, available from IMASS Incorporated, Accord, Mass.). Three replicates of each sample were evaluated, the results normalized to Newtons/decimeter (N/dm), and the average value reported.

Shear Strength at 23° C.:

Shear strength at 23° C. and 50 percent relative humidity (RH) was measured as described in ASTM D3654/D 3654M-06: "Standard Test Methods for Shear Adhesion of Pressure-Sensitive Tapes" (Reapproved 2011). After conditioning for 24 hours at 23° C. and 50 percent relative humidity (RH), tape samples measuring 12.7 millimeters wide and 15.2 centimeters long were cut. The release liner was removed and a tape sample was then applied to a stainless steel panel. Prior to tape application, the panel was wiped clean first with methyl ethyl ketone (MEK), then with n-heptane, and finally with MEK. The sample was then centered on the panel and adhered to one end such that tape overlapped the panel by 25.4 millimeters in the lengthwise direction. The tape sample on the panel was rolled twice in each direction using a 2 kilogram rubber roller. A 1.0 kilogram weight was then attached to the free end of the tape, and the panel/tape/weight assembly was suspended in a stand at an angle of 2° from vertical. The time, in minutes, for the tape to fall from the panel was recorded. The test was terminated at 10,000 minutes. If the tape was still attached to the panel at 10,000 minutes, the result was recorded as ">10,000 min". Three replicates of each sample were evaluated and the average value was reported.

Shear Strength at 70° C.:

Shear strength at 70° C. was evaluated in the same manner as described for 23° C. testing with the following modifications. A weight of 0.5 kilograms was used and the panel/tape/weight assembly was suspended an angle of 2° from vertical in a stand that was in an oven set at 70° C.

Materials.

| Material Name (abbreviation) | Source |
|---|---|
| Hexanediol diacrylate (HDDA) | Available from Sartomer Americas, Exton, PA |
| Acrylic acid (AA) | Available from Sigma-Aldrich Corporation, St. Louis, MO |
| Isooctyl acrylate (IOA) | Obtained from 3M Company, St. Paul, MN |
| IRGACURE 651 | Available from Ciba Specialty Chemicals, Tarrytown, NJ |
| Isooctyl thioglycolate (IOTC) | Available from TCI America, Portland, OR |
| 2-ethylhexyl 2,2-dichloroacetate | Prepared as described in Preparatory Example 1 |
| Potassium isopropyl xanthate | Available from TCI America, Portland, OR |
| Dichloroacetyl chloride | Available from ThermoFisher Scientific, Waltham, MA |
| Methyl dichloroacetate | Available from Sigma-Aldrich Corporation, St. Louis, MO |
| Diethyldithiocarbamate trihydrate | Available from Sigma-Aldrich Corporation |
| FORAL 85 tackifier, which is a hydrogenated rosin ester tackifier | Available from Eastman Chemical Company, Kingsport, TN |
| ARKON P100, which is a hydrogenated hydrocarbon resin tackifier | Available from Arakawa Chemical, Chicago, IL |

| Material Name (abbreviation) | Source |
|---|---|
| ARKON P125, which is a hydrogenated hydrocarbon resin tackifier | Available from Arakawa Chemical, Chicago, IL |
| REGALREZ 6108, which is a hydrocarbon resin tackifier | Available from Eastman Chemical Company, Kingsport, TN |

Preparatory Example 1: Synthesis of 2-ethylhexyl 2,2-dichloroacetate

A stirred solution of 2-ethylhexanol (3.00 grams, 23.0 mmol) in 50 mL of $CH_2Cl_2$ was cooled to 0° C. under nitrogen. To the solution were added trimethylamine (4.80 mL, 34.4 mmol) and dimethylaminopyridine (20 milligrams) followed by the dropwise addition of dichloroacetyl chloride (3.74 grams, 25.4 mmol,). The reaction mixture was allowed to reach ambient temperature while stirring overnight. The reaction mixture was quenched with a saturated solution of $NaHCO_3$ followed by addition of 50 mL of $CH_2Cl_2$. The layers were separated and the organic portion was washed with 5% $NaH_2PO_4$ (2×) followed by brine. The organic portion was dried over $Na_2SO_4$, filtered through a small plug of silica gel, and concentrated under reduced pressure to give 5.02 grams of 2-ethylhexyl 2,2-dichloroacetate as a yellow liquid.

Photoinitiator Example 1: 2-Ethylhexyl 2,2-bis(isopropoxycarbothioylsulfanyl)acetate

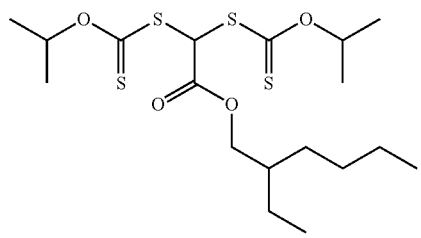 [SMILES: CCCCC(CC)COC(=O)C(SC(=S)OC(C)C)SC(=S)OC(C)C]

A solution of 2-ethylhexyl 2,2-dichloroacetate (7.14 grams, 29.6 mmol, prepared as described in Preparatory Example 1) dissolved in 150 mL of acetone was treated with potassium isopropyl xanthate (10.3 grams, 59.3 mmol) and the reaction mixture was stirred overnight. The reaction mixture was filtered, rinsed with acetone, and the filtrate was concentrated to give a brown syrup. Purification by column chromatography ($SiO_2$, 100 volume percent hexanes to 40 volume percent $CH_2Cl_2$/hexanes) gave 9.3 grams of 2-ethylhexyl 2,2-bis(isopropoxycarbothioylsulfanyl)acetate as an amber colored liquid. $^1$H NMR ($CDCl_3$, 500 MHz) δ 6.05 (s, 1H), 5.73 (m, 2H), 4.10 (m, 2H), 1.61 (m, 1H), 1.42 (d, J=6.3 Hz, 6H), 1.40 (d, J=6.3, 6H), 1.37 (m, 2H), 1.34-1.26 (m, 6H), 0.89 (t, J=6.9, 3H), 0.89 (t, J=7.4, 3H).

Photoinitiator Example 2: Methyl 2,2-bis(isopropoxycarbothioylsulfanyl)acetate

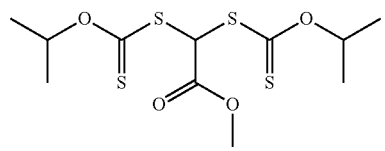 [SMILES: COC(=O)C(SC(=S)OC(C)C)SC(=S)OC(C)C]

A solution of methyl dichloroacetate (7.15 grams, 50.0 mmol) dissolved in 250 mL of acetone was treated with potassium isopropyl xanthate (17.5 grams, 100 mmol) and the reaction mixture was stirred overnight. The reaction mixture was filtered through a plug of silica gel, rinsed with acetone, and the filtrate was concentrated to give a brown syrup. Purification by column chromatography ($SiO_2$, 18% $CH_2Cl_2$/hexanes to 50% $CH_2Cl_2$/hexanes) gave 11.5 grams of methyl 2,2-bis(isopropoxycarbothioylsulfanyl)acetate as an amber colored syrup. $^1$H NMR ($CDCl_3$, 500 MHz) δ 6.03 (s, 1H), 5.73 (m, 2H), 3.82 (s, 3H), 1.42 (d, J=6.3 Hz, 6H), 1.40 (d, J=6.3, 6H).

Photoinitiator Example 3: 2-Ethylhexyl 2,2-bis(diethylcarbamothioylsulfanyl)acetate

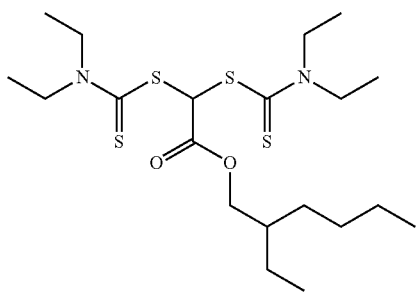 [SMILES: CCCCC(CC)COC(=O)C(SC(=S)N(CC)CC)SC(=S)N(CC)CC]

The 2-ethylhexyl 2,2-dichloroacetate of Preparatory Example 1 (5.02 grams, 20.8 mmol) was dissolved in 50 mL of acetone and treated with sodium diethyldithiocarbamate trihydrate (9.37 grams, 41.6 mmol) and the mixture was stirred overnight. The reaction mixture was filtered, rinsed with acetone, and the filtrate was concentrated to give a dark brown oil. The oil was taken up in 100 mL of $CH_2Cl_2$ and washed with brine. The organic layer was dried over $Na_2SO_4$, filtered and concentrated under reduced pressure. The resulting brown syrup was passed through a small plug of silica gel eluting with 1:1 hexanes/$CH_2Cl_2$ and concentrated to give 7.17 grams of 2-ethylhexyl 2,2-bis(diethylcarbamothioylsulfanyl)acetate as an orange syrup. $^1$H NMR ($CDCl_3$, 500 MHz) d 7.22 (s, 1H), 4.11 (dd, J=5.4, 10.8 Hz, 1H), 4.07 (dd, J=5.9, 10.8 Hz, 1H), 3.98 (quartet, J=7.1 Hz, 4H), 3.72 (quartet, J=7.2 Hz, 4H), 1.61 (m, 1H), 1.40-1.25 m, 8H), 1.31 (t, J=7.2 Hz, 6H), 1.26 (t, J=7.1, 6H), 0.89-0.86 (m, 6H).

Example 1

A 250 mL flask was charged with 90.0 grams of isooctyl acrylate (IOA), 10.0 grams of acrylic acid (AA), and 0.302 grams of 2-ethylhexyl 2,2-bis(isopropoxycarbothioylsulfanyl)acetate (Photoinitiator Example 1). The mixture was vigorously degassed with a stream of nitrogen for 15-20 minutes. Under a positive pressure of nitrogen, the contents of the flask were stirred and exposed to UV-A irradiation for approximately 7 minutes. The nitrogen supply was then removed and the sample was transferred to a glass bottle. The UV-A light source was a black light fluorescent lamp having a peak emission of 350 nanometers. The percent conversion (in weight percent) of the monomers to syrup polymer was determined to be 39 percent. In Table 1, the theoretical molecular weight, the number average molecular weight ($M_n$), weight average molecular weight ($M_w$), and polydispersity (PD) values for the polymer are presented. In all Tables of the Examples Section, theoretical molecular weight, $M_n$ and $M_w$ are reported in Daltons (Da).

Hexanediol diacrylate (HDDA) (20 milligrams) was added to a bottle containing 20 grams of the syrup polymer and the components were mixed for one hour using a bottle roller mixer. The resulting crosslinkable composition was then coated between a primed, 50 micrometer thick polyester (PET) substrate film (available as HOSTAPHAN 3SAB from Mitsubishi Polyester Film, Incorporated, Greer, S.C.) and a 37.5 micrometer thick silicone release liner (available from Siliconature USA LLC, Chicago, Ill.) using a knife coater with a gap setting of 0.050 millimeters. The coated crosslinkable composition was exposed to UV-A irradiation for 5 minutes using an array of LEDs having a UV-A peak emission wavelength of 365 nanometers to provide a total energy of 3000 milliJoules/square centimeter. A Power Puck radiometer (available from EIT Incorporated, Sterling, Va.) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The peel adhesion and shear strengths for the tape were determined by the methods described above and are reported in Table 2.

Comparative Example 1

The same procedure as described for Example 1 was followed with the exception that HDDA was not added to the syrup polymer. The peel adhesion and shear strengths for the tape were determined by the methods described above and are reported in Table 1.

Example 2

A 250 mL flask was charged with 90.0 grams of isooctyl acrylate (IOA), 10.0 grams of acrylic acid (AA), and 0.159 grams of 2-ethylhexyl 2,2-bis(isopropoxycarbothioylsulfanyl)acetate (Photoinitiator Example 1). The mixture was vigorously degassed with a stream of nitrogen for 15-20 minutes. Under a positive pressure of nitrogen, the contents of the flask were stirred and exposed to UV-A irradiation for approximately 11 minutes. The nitrogen supply was then removed and the sample was transferred to a glass bottle. The UV-A light source was a black light fluorescent lamp having a peak emission of 350 nanometers. The percent conversion (in weight percent) of the monomers to syrup polymer was determined to be 39 percent. In Table 1, the theoretical molecular weight, the number average molecular weight ($M_n$), weight average molecular weight ($M_w$), and polydispersity (PD) values for the polymer are presented.

Hexanediol diacrylate (HDDA) (20 milligrams) was added to a bottle containing 20 grams of the syrup polymer and the components were mixed for one hour using a bottle roller mixer. The resulting crosslinkable composition was then coated between a primed, 50 micrometer thick polyester (PET) film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using an array of LEDs having a UV-A peak emission wavelength of 365 nanometers to provide a total energy of 3000 milliJoules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The peel adhesion and shear strengths for the tape were determined by the methods described above and are reported in Table 2.

Comparative Example 2

The same procedure as described for Example 2 was followed with the exception that HDDA was not added to the syrup polymer. The peel adhesion and shear strengths for the tape were determined by the methods described above and are reported in Table 2.

Example 3

A 250 mL flask was charged with 90 grams of isooctyl acrylate (IOA), 10 grams of acrylic acid (AA), and 0.081 grams of 2-ethylhexyl 2,2-bis(isopropoxycarbothioylsulfanyl)acetate (Photoinitiator Example 1). The mixture was vigorously degassed with a stream of nitrogen for 15-20 minutes. Under a positive pressure of nitrogen, the contents of the flask were stirred and exposed to UV-A irradiation for approximately 3.5 minutes. The nitrogen supply was then removed and the sample was transferred to a glass bottle. The UV-A light source was a black light fluorescent lamp having a peak emission of 350 nanometers. The percent conversion (in weight percent) of the monomers to syrup polymer was determined to be 28 percent. In Table 1, the theoretical molecular weight, the number average molecular weight ($M_n$), weight average molecular weight ($M_w$), and polydispersity (PD) values for the polymer are presented.

Hexanediol diacrylate (HDDA) (20 milligrams) was added to a bottle containing 20 grams of the syrup polymer and the components were mixed for one hour using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using an array of LEDs having a UV-A peak emission wavelength of 365 nanometers to provide a total energy of 3000 milli-Joules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The peel adhesion and shear strengths for the tape were determined by the methods described above and are reported in Table 2.

Comparative Example 3

The same procedure as described for Example 3 was followed with the exception that HDDA was not added to the syrup polymer. The peel adhesion and shear strengths for the tape were determined by the methods described above and are reported in Table 2.

TABLE 1

Characterization of Syrup Polymers Prepared in Examples 1-3

| Example # | Percent Monomer Conversion (wt. %) | Theoretical Molecular Weight (Da) | GPC Data for Polymer | | |
|---|---|---|---|---|---|
| | | | $M_n$ (Da) | $M_w$ (Da) | PD |
| 1 | 39 | 56,900 | 51,200 | 97,200 | 1.89 |
| 2 | 39 | 108,200 | 95,700 | 176,600 | 1.84 |
| 3 | 28 | 151,000 | 122,200 | 258,900 | 2.11 |

TABLE 2

Characterization of Tapes Prepared from Examples 1-3 and Comparative Examples 1-3

| Example included in Tape Construction | Peel Adhesion (N/dm) | Shear Strength at 23° C. (minutes) | Shear Strength at 70° C. (minutes) |
|---|---|---|---|
| Example 1 | 74 | 15 cohesive failure | 1 cohesive failure |
| Comparative Example 1 | 79 | 5 cohesive failure | 1 cohesive failure |
| Example 2 | 59 | 532 cohesive failure | 200 cohesive failure |
| Comparative Example 2 | 65 | 10 cohesive failure | 1 cohesive failure |
| Example 3 | 50 | 8,307 cohesive failure | >10,000 |
| Comparative Example 3 | 59 | 30 cohesive failure | 6 cohesive failure |

The higher the concentration of initiator used, the lower the molecular weight of the syrup polymer (the polymer in the syrup). The ratio between the concentration of the initiator to the concentration of the crosslinker and the molecular weight of the polymer with reactive end groups in the syrup determines whether the polymer undergoes branching or crosslinking.

Example 4

A bottle was charged with 90.0 grams of isooctyl acrylate (IOA), 10.0 grams of acrylic acid (AA), and 0.04 grams of 2-ethylhexyl 2,2-bis(isopropoxycarbothioylsulfanyl)acetate (Photoinitiator Example 1). The mixture was vigorously degassed with a stream of nitrogen for 15-20 minutes and then sealed. The contents of the flask were stirred and exposed to UV-A irradiation for approximately 2 minutes. The UV-A light source was a black light fluorescent lamp having a peak emission of 350 nanometers. The percent conversion (in weight percent) of the monomers to syrup polymer was determined to be 23 percent. In Table 3, the theoretical molecular weight, the number average molecular weight ($M_n$), weight average molecular weight ($M_w$), and polydispersity (PD) values for the polymer are presented.

Hexanediol diacrylate (HDDA) (20 milligrams) and 0.032 grams of 2-ethylhexyl 2,2-bis(isopropoxycarbothioylsulfanyl)acetate (Photoinitiator Example 1) were added to a bottle containing 20 grams of the syrup polymer and the components were mixed overnight using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using an array of LEDs having a UV-A peak emission wavelength of 365 nanometers to provide a total energy of 3000 milli-Joules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The peel adhesion and shear strengths for the tape were determined by the methods described above and are reported in Table 4.

Comparative Example 4

A portion of the syrup polymer prepared in Example 4 was used. The same procedure as described for Example 4 was followed with the exception that HDDA was not added to the syrup polymer (i.e. no crosslinker group added). The peel adhesion and shear strengths for the tape were determined by the methods described above and are reported in Table 4.

Comparative Example 4a

The same procedure as reported for the preparation of the syrup polymer in Example 4 was followed with the exception that the 2-ethylhexyl 2,2-bis(isopropoxycarbothioylsulfanyl) acetate (Photoinitiator Example 1) was replaced with 0.04 grams of IRGACURE 651. The percent conversion (in weight percent) of the monomers to syrup polymer was determined to be 14 percent. In Table 3, the number average molecular weight ($M_n$), weight average molecular weight ($M_w$), and polydispersity (PD) values for the polymer are presented.

The same procedure reported in Example 4 for forming the crosslinked composition as a pressure-sensitive adhesive tape was followed with the exception that the 0.032 grams of 2-ethylhexyl 2,2-bis(isopropoxycarbothioylsulfanyl)acetate (Photoinitiator Example 1) was replaced with 0.032 grams of IRGACURE 651 in the crosslinkable composition.

The peel adhesion and shear strengths for the tape were determined by the methods described above and are reported in Table 4.

Comparative Example 4b

The same procedure as reported for the preparation of the syrup polymer in Example 4 was followed with the exception that the 2-ethylhexyl 2,2-bis(isopropoxycarbothioylsulfanyl)acetate (Photoinitiator Example 1) was replaced with 0.04 grams of IRGACURE 651 and 0.03 grams of isooctyl thioglycolate (IOTG). The percent conversion (in weight percent) of the monomers to syrup polymer was determined to be 23 percent. In Table 3, the number average molecular weight ($M_n$), weight average molecular weight ($M_w$) and polydispersity (PD) values for the polymer are presented.

The same procedure reported in Example 4 for forming the crosslinked composition as a pressure-sensitive adhesive tape was followed with the exception that the 0.032 grams of 2-ethylhexyl 2,2-bis(isopropoxycarbothioylsulfanyl)acetate (Photoinitiator Example 1) was replaced with 0.032 grams of IRGACURE 651 in the crosslinkable composition.

The peel adhesion and shear strengths for the tape were determined by the methods described above and are reported in Table 4.

TABLE 3

Characterization of Syrup Polymers Prepared in Example 4 and Comparative Examples 4, 4a, and 4b

| Example # | Percent Monomer Conversion (wt. %) | Theoretical Molecular Weight (Da) | GPC Data for Polymer | | |
|---|---|---|---|---|---|
| | | | $M_n$ (Da) | $M_w$ (Da) | PD |
| Example 4 and Comparative Example 4 | 23 | 254,500 | 241,000 | 556,200 | 2.3 |
| Comparative Example 4a | 14 | not applicable | 1,530,000 | 2,614,000 | 1.7 |
| Comparative Example 4b | 23 | not applicable | 259,100 | 474,100 | 1.82 |

TABLE 4

Characterization of Tapes Prepared from Example 4 and Comparative Examples 4, 4a, and 4b

| Example included in Tape Construction | Peel Adhesion (N/dm) | Shear Strength at 23° C. (minutes) | Shear Strength at 70° C. (minutes) |
|---|---|---|---|
| Example 4 | 61 | >10,000 | >10,000 |
| Comparative Example 4 | 69 | 293 cohesive failure | 57 cohesive failure |
| Comparative Example 4a | 72 | >10,000 | 796 cohesive failure |
| Comparative Example 4b | 64 | 1,287 cohesive failure | 105 cohesive failure |

Example 4 had a higher shear strength at 70° C. than any of Comparative Examples 4, 4a, and 4b. The polymeric material of Example 4 was more effectively crosslinked due to its reactive terminal groups.

Example 5

A 250 mL flask was charged with 90.0 grams of isooctyl acrylate (IOA), 10.0 grams of acrylic acid (AA), and 0.065 grams of methyl 2,2-bis(isopropoxycarbothioylsulfanyl)acetate (Photoinitiator Example 2). The mixture was vigorously degassed with a stream of nitrogen for 15-20 minutes. Under a positive pressure of nitrogen, the contents of the flask were stirred and exposed to UV-A irradiation for approximately 5 minutes. The nitrogen supply was then removed and the sample was transferred to a glass bottle. The UV-A light source was a black light fluorescent lamp having a peak emission of 350 nanometers. The percent conversion (in weight percent) of the monomers to syrup polymer was determined to be 31 percent. In Table 5, the theoretical molecular weight, the number average molecular weight ($M_n$), weight average molecular weight ($M_w$), and polydispersity (PD) values for the polymer are presented.

Hexanediol diacrylate (HDDA) (20 milligrams) and 0.008 grams of IRGACURE 651 were added to a bottle containing 20 grams of the syrup polymer and the components were mixed overnight using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using an array of LEDs having a UV-A peak emission wavelength of 365 nanometers to provide a total energy of 3000 milliJoules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The peel adhesion and shear strengths for the tape were determined by the methods described above and are reported in Table 6.

Comparative Example 5

The same procedure as described for Example 5 was followed with the exception that HDDA was not added to the syrup polymer. The peel adhesion and shear strengths for the tape were determined by the methods described above and are reported in Table 6.

Example 6

The same procedure as reported for the preparation of the syrup polymer in Example 5 was followed with the exception that 0.034 grams of methyl 2,2-bis(isopropoxycarbothioylsulfanyl)acetate (Photoinitiator Example 2) was used (instead of 0.065 grams) and the reaction flask was exposed to UV-A irradiation for approximately 5.5 minutes (instead of 5 minutes). The percent conversion (in weight percent) of the monomers to syrup polymer was determined to be 28 percent. In Table 5, the theoretical molecular weight, the number average molecular weight ($M_n$), weight average molecular weight ($M_w$), and polydispersity (PD) values for the polymer are presented.

The same procedure reported in Example 5 for forming the crosslinked composition as a pressure-sensitive adhesive tape was followed with the exception that 0.024 grams of IRGACURE 651 was included in the crosslinkable composition (instead of 0.008 grams). The peel adhesion and shear strengths for the tape were determined by the methods described above and are reported in Table 6.

Comparative Example 6

The same procedure as described for Example 6 was followed with the exception that HDDA was not added to the syrup polymer. The peel adhesion and shear strengths for the tape were determined by the methods described above and are reported in Table 6.

Example 7

The same procedure as reported for the preparation of the syrup polymer in Example 5 was followed with the exception that 0.033 grams of methyl 2,2-bis(isopropoxycarbothioylsulfanyl)acetate (Photoinitiator Example 2) was used (instead of 0.065 grams). The percent conversion (in weight percent) of the monomers to syrup polymer was determined to be 27 percent. In Table 5, the theoretical molecular weight, the number average molecular weight ($M_n$), weight average molecular weight ($M_w$), and polydispersity (PD) values for the polymer are presented.

The same procedure reported in Example 5 for forming the crosslinked composition as a pressure-sensitive adhesive tape was followed with the exception that 0.016 grams of IRGACURE 651 was included in the crosslinkable composition (instead of 0.008 grams). The peel adhesion and shear strengths for the tape were determined by the methods described above and are reported in Table 6.

Comparative Example 7

The same procedure as described for Example 7 was followed with the exception that HDDA was not added to the syrup polymer. The peel adhesion and shear for the tape were determined by the methods described above and are reported in Table 6.

Example 8

The same procedure as reported for the preparation of the syrup polymer in Example 5 was followed with the exception that 0.032 grams of methyl 2,2-bis(isopropoxycarbothioylsulfanyl)acetate (Photoinitiator Example 2) was used (instead of 0.065 grams). The percent conversion (in weight percent) of the monomers to syrup polymer was determined to be 25 percent. In Table 5, the theoretical molecular weight, the number average molecular weight ($M_n$), weight average molecular weight ($M_w$), and polydispersity (PD) values for the polymer are presented.

The same procedure reported in Example 5 for forming the crosslinked composition as a pressure-sensitive adhesive tape was followed. The peel adhesion and shear strengths for the tape were determined by the methods described above and are reported in Table 6.

Comparative Example 8

The same procedure as described for Example 8 was followed with the exception that HDDA was not added to the syrup polymer. The peel adhesion and shear strengths for the tape were determined by the methods described above and are reported in Table 6.

Example 9

The same procedure as reported for the preparation of the syrup polymer in Example 5 was followed with the exception that 0.031 grams of methyl 2,2-bis(isopropoxycarbothioylsulfanyl)acetate (Photoinitiator Example 2) was used (instead of 0.065 grams). The percent conversion (in weight percent) of the monomers to syrup polymer was determined to be 24 percent. In Table 5, the theoretical molecular weight, the number average molecular weight ($M_n$), weight average molecular weight ($M_w$), and polydispersity (PD) values for the polymer are presented.

The same procedure reported in Example 5 for forming the crosslinked composition as a pressure-sensitive adhesive tape was followed with the exception that IRGACURE 651 was not included in the crosslinkable composition. The peel adhesion and shear strengths for the tape were determined by the methods described above and are reported in Table 6.

Comparative Example 9

The same procedure as described for Example 9 was followed with the exception that HDDA was not added to the syrup polymer. The peel adhesion and shear strengths for the tape were determined by the methods described above and are reported in Table 6.

Example 10

The same procedure as reported for the preparation of the syrup polymer in Example 5 was followed with the exception that 0.0165 grams of methyl 2,2-bis(isopropoxycarbothioylsulfanyl)acetate (Photoinitiator Example 2) was used (instead of 0.065 grams) and the reaction flask was exposed to UV-A irradiation for approximately 6.5 minutes (instead of 5 minutes). The percent conversion (in weight percent) of the monomers to syrup polymer was determined to be 24 percent. In Table 5, the theoretical molecular weight, the number average molecular weight ($M_n$), weight average molecular weight ($M_w$), and polydispersity (PD) values for the polymer are presented.

The same procedure reported in Example 5 for forming the crosslinked composition as a pressure-sensitive adhesive tape was followed with the exception that IRGACURE 651 was not included in the crosslinkable composition. The peel adhesion and shear strengths for the tape were determined by the methods described above and are reported in Table 6.

Comparative Example 10

The same procedure as described for Example 10 was followed with the exception that HDDA was not added to the syrup polymer. The peel adhesion and shear strengths for the tape were determined by the methods described above and are reported in Table 5.

TABLE 5

Characterization of Syrup Polymers Prepared in Examples 5-10

| Example # | Percent Monomer Conversion (wt. %) | Theoretical Molecular Weight (Da) | GPC Data for Polymer | | |
|---|---|---|---|---|---|
| | | | $M_n$ (Da) | $M_w$ (Da) | PD |
| Example 5 | 31 | 162,100 | 192,000 | 319,000 | 1.66 |
| Example 6 | 28 | 310,708 | 353,000 | 551,000 | 1.57 |
| Example 7 | 27 | 273,902 | 318,000 | 521,000 | 1.64 |
| Example 8 | 25 | 260,150 | 340,000 | 551,000 | 1.62 |
| Example 9 | 24 | 263,812 | 306,000 | 563,000 | 1.85 |
| Example 10 | 24 | 502,446 | 547,000 | 905,000 | 1.65 |

TABLE 6

Characterization of Tapes Prepared from Examples 5-10 and Comparative Examples 5-10

| Example included in Tape Construction | Peel Adhesion (N/dm) | Shear Strength at 23° C. (minutes) |
|---|---|---|
| Example 5 | 43 | >10,000 |
| Comparative Example 5 | 62 | 17 cohesive failure |
| Example 6 | 40 | >10,000 |
| Comparative Example 6 | 55 | 72 cohesive failure |
| Example 7 | 35 | >10,000 |
| Comparative Example 7 | 55 | 40 cohesive failure |
| Example 8 | 37 | >10,000 |
| Comparative Example 8 | 53 | 93 cohesive failure |
| Example 9 | 34 | >10,000 |
| Comparative Example 9 | 44 | 28 cohesive failure |
| Example 10 | 23 | >10,000 |
| Comparative Example 10 | 24 | 59 cohesive failure |

Example 11

Hexanediol diacrylate (HDDA) (20 milligrams) and 0.008 grams of IRGACURE 651 were added to a bottle containing 20 grams of the syrup polymer from Example 5 and the components were mixed overnight using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using a low intensity black light having a UV-A peak emission wavelength of 350 nanometers to provide a total energy of 600 milliJoules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The shear strength for the tape was determined by the method described above and is reported in Table 7.

Example 12

Hexanediol diacrylate (HDDA) (20 milligrams) and 0.024 grams of IRGACURE 651 were added to a bottle containing 20 grams of the syrup polymer from Example 6 and the components were mixed overnight using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using a low intensity black light having a UV-A peak emission wavelength of 350 nanometers to provide a total energy of 600 milliJoules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The shear strength for the tape was determined by the method described above and is reported in Table 7.

Example 13

Hexanediol diacrylate (HDDA) (20 milligrams) and 0.016 grams of IRGACURE 651 were added to a bottle containing 20 grams of the syrup polymer from Example 7 and the components were mixed overnight using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using a low intensity black light having a UV-A peak emission wavelength of 350 nanometers to provide a total energy of 600 milliJoules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The shear strength for the tape was determined by the method described above and is reported in Table 7.

Example 14

Hexanediol diacrylate (HDDA) (20 milligrams) and 0.008 grams of IRGACURE 651 were added to a bottle containing 20 grams of the syrup polymer from Example 8 and the components were mixed overnight using a bottle roller mixer. The resulting crosslinkable composition was then coated between a primed, 50 micrometer thick polyester (PET) substrate film (available as HOSTAPHAN 3SAB from Mitsubishi Polyester Film, Incorporated) and a 37.5 micrometer thick silicone release liner (available from Siliconature USA LLC) using a knife coater with a gap setting of 0.050 millimeters. The coated crosslinkable composition was exposed to UV-A irradiation for 5 minutes using a low intensity black light having a UV-A peak emission wavelength of 350 nanometers to provide a total energy of 600 milliJoules/square centimeter. A Power Puck radiometer (available from EIT Incorporated) was used to determine the radiant power, which was then used to calculate total energy of exposure. This gave the crosslinked composition as an acrylic pressure-sensitive adhesive tape (i.e. pressure-sensitive adhesive material coated between substrate film and a release liner film). The shear strength for the tape was determined by the method described above and is reported in Table 7.

TABLE 7

Characterization of Tapes Prepared from Examples 11-14

| Example included in Tape Construction | Shear Strength at 23° C. (minutes) |
| --- | --- |
| Example 11 | >10,000 |
| Example 12 | >10,000 |
| Example 13 | >10,000 |
| Example 14 | >10,000 |

Example 15

A 250 mL flask was charged with 90.0 grams of isooctyl acrylate (IOA), 10.0 grams of acrylic acid (AA), and 0.162 grams of 2-ethylhexyl 2,2-bis(diethylcarbamothioylsulfanyl)acetate (Photoinitiator Example 3). The mixture was vigorously degassed with a stream of nitrogen for 15-20 minutes. Under a positive pressure of nitrogen, the contents of the flask were stirred and exposed to UV-A irradiation for approximately 19 minutes. The nitrogen supply was then removed and the sample was transferred to a glass bottle. The UV-A light source was a black light fluorescent lamp having a peak emission of 350 nanometers. The percent conversion (in weight percent) of the monomers to syrup polymer was determined to be 26.

Hexanediol diacrylate (HDDA) (30 milligrams) and 0.049 grams of IRGACURE 651 were added to a bottle containing 30 grams of the syrup polymer and the components were mixed for 2.5 hours using a LABQUAKE Shaker Rotisserie (available from ThermoFisher Scientific, Waltham Mass.). The resulting crosslinkable composition was then coated between a primed, 50 micrometer thick polyester (PET) substrate film (available as HOSTAPHAN 3SAB from Mitsubishi Polyester Film, Incorporated) and a 50 micrometer thick T10 silicone release liner (available from Solvay, Houston, Tex.) using a knife coater with a gap setting of 0.050 millimeters. The coated crosslinkable composition was exposed to UV-A irradiation for 10 minutes using two arrays of low intensity black lights, with one array positioned above the film and one array positioned below the film. The black lights had a UV-A peak emission wavelength of 350 nanometers to provide a total energy of 145-170 milliJoules/square centimeter from each side. This gave the crosslinked composition as an acrylic pressure-sensitive adhesive tape (i.e. pressure-sensitive adhesive material coated between substrate film and a release liner film). The peel and shear adhesion values for the tape were 77 N/dm and 3015 minutes, respectively, as determined by the methods described above.

Example 16

A glass jar was charged with 327.25 grams of isooctyl acrylate (IOA), 22.75 grams of acrylic acid (AA), and 0.207 grams of methyl 2,2-bis(isopropoxycarbothioylsulfanyl)acetate (Photoinitiator Example 2). The mixture was vigorously degassed with a stream of nitrogen for 5 minutes. After decreasing the nitrogen flow rate the contents of the jar were mixed and exposed to UV-A light for 6 minutes. The UV-A light source was an array of LEDs having a UV-A peak emission wavelength of 365 nanometers. The percent conversion (in weight percent) of the monomers to syrup polymer was determined to be 31.0 percent.

Hexanediol diacrylate (HDDA) (63 milligrams) and 0.0161 grams of IRGACURE 651 were added to a bottle containing 27 grams of the syrup polymer and the components were mixed for 4 hours using a LABQUAKE Shaker Rotisserie. The resulting crosslinkable composition was then coated between a primed, 50 micrometer thick polyester (PET) substrate film (available as HOSTAPHAN 3SAB from Mitsubishi Polyester Film, Incorporated) and a 50 micrometer thick T10 silicone release liner (available from Solvay, Houston, Tex.) using a knife coater with a gap setting of 0.050 millimeters. The coated crosslinkable composition was exposed to UV-A irradiation for 10 minutes using two arrays of low intensity black lights, with one array positioned above the film and one array positioned below the film. The black lights had a UV-A peak emission wavelength of 350 nanometers to provide a total energy of 145-170 milliJoules/square centimeter from each side. This gave the crosslinked composition as an acrylic pressure-sensitive adhesive tape (i.e. pressure-sensitive adhesive material coated between substrate film and a release liner film). The peel and shear adhesion values for the tape were determined by the methods described above and are reported in Table 8.

Example 17

Hexanediol diacrylate (HDDA) (65 milligrams), 0.0163 grams of IRGACURE 651 and 3.0 grams of FORAL 85 tackifier were added to a bottle containing 27 grams of the syrup polymer from Example 16 and the components were mixed for 4 hours using a LABQUAKE Shaker Rotisserie. The resulting crosslinkable composition was then coated between a primed, 50 micrometer thick polyester (PET) substrate film (available as HOSTAPHAN 3SAB from Mitsubishi Polyester Film, Incorporated) and a 50 micrometer thick T10 silicone release liner (available from Eastman Chemical Company) using a knife coater with a gap setting of 0.050 millimeters. The coated crosslinkable composition was exposed to UV-A irradiation for 10 minutes using two arrays of low intensity black lights, with one array positioned above the film and one array positioned below the film. The black lights had a UV-A peak emission wavelength of 350 nanometers to provide a total energy of 145-170 milliJoules/square centimeter from each side. This gave the crosslinked composition as an acrylic pressure-sensitive adhesive tape (i.e. pressure-sensitive adhesive material coated between substrate film and a release liner film). The peel and shear adhesion values for the tape were determined by the methods described above and are reported in Table 8.

Example 18

Hexanediol diacrylate (HDDA) (62 milligrams), 0.0166 grams of IRGACURE 651 and 3.0 grams of REGALREZ 6108 tackifier were added to a bottle containing 27 grams of the syrup polymer from Example 16 and the components were mixed for 4 hours using a LABQUAKE Shaker Rotisserie. The resulting crosslinkable composition was then coated between a primed, 50 micrometer thick polyester (PET) substrate film (available as HOSTAPHAN 3SAB from Mitsubishi Polyester Film, Incorporated) and a 50 micrometer thick T10 silicone release liner (available from Eastman Chemical Company) using a knife coater with a gap setting of 0.050 millimeters. The coated crosslinkable composition was exposed to UV-A irradiation for 10 minutes using two arrays of low intensity black lights, with one array positioned above the film and one array positioned below the film. The black lights had a UV-A peak emission wavelength of 350 nanometers to provide a total energy of 145-170 milliJoules/square centimeter from each side. This gave the crosslinked composition as an acrylic pressure-sensitive adhesive tape (i.e. pressure-sensitive adhesive material coated between substrate film and a release liner film). The peel and shear adhesion values for the tape were determined by the methods described above and are reported in Table 8.

Example 19

Hexanediol diacrylate (HDDA) (62 milligrams), 0.0156 grams of IRGACURE 651 and 3.0 grams of ARKON P100 tackifier were added to a bottle containing 27 grams of the syrup polymer from Example 16 and the components were mixed for 16 hours using a LABQUAKE Shaker Rotisserie. The resulting crosslinkable composition was then coated between a primed, 50 micrometer thick polyester (PET) substrate film (available as HOSTAPHAN 3SAB from Mitsubishi Polyester Film, Incorporated) and a 50 micrometer thick T10 silicone release liner (available from Eastman Chemical Company) using a knife coater with a gap setting of 0.050 millimeters. The coated crosslinkable composition was exposed to UV-A irradiation for 10 minutes using two arrays of low intensity black lights, with one array positioned above the film and one array positioned below the film. The black lights had a UV-A peak emission wavelength of 350 nanometers to provide a total energy of 145-170 milliJoules/square centimeter from each side. This gave the crosslinked composition as an acrylic pressure-sensitive adhesive tape (i.e. pressure-sensitive adhesive material coated between substrate film and a release liner film). The peel and shear adhesion values for the tape were determined by the methods described above and are reported in Table 8.

Example 20

Hexanediol diacrylate (HDDA) (56 milligrams), 0.0160 grams of IRGACURE 651 and 3.0 grams of ARKON P125 tackifier were added to a bottle containing 27 grams of the syrup polymer from Example 16 and the components were mixed for 16 hours using a LABQUAKE Shaker Rotisserie. The resulting crosslinkable composition was then coated between a primed, 50 micrometer thick polyester (PET) substrate film (available as HOSTAPHAN 3SAB from Mitsubishi Polyester Film, Incorporated) and a 50 micrometer thick T10 silicone release liner (available from Eastman Chemical Company) using a knife coater with a gap setting of 0.050 millimeters. The coated crosslinkable composition was exposed to UV-A irradiation for 10 minutes using two arrays of low intensity black lights, with one array positioned above the film and one array positioned below the film. The black lights had a UV-A peak emission wavelength of 350 nanometers to provide a total energy of 145-170 milliJoules/square centimeter from each side. This gave the crosslinked composition as an acrylic pressure-sensitive adhesive tape (i.e. pressure-sensitive adhesive material coated between substrate film and a release liner film). The peel and shear adhesion values for the tape were determined by the methods described above and a reported in Table 8.

TABLE 8

| Characterization of Tapes Prepared from Examples 16-20 | | |
|---|---|---|
| Example included in Tape Construction | Peel Adhesion (N/dm) | Shear Strength at 23° C. (minutes) |
| Example 16 | 49 | >10,000 |
| Example 17 | 32 | 7159 cohesive failure |
| Example 18 | 42 | >10,000 |
| Example 19 | 33 | >10,000 |
| Example 20 | 38 | >10,000 |

What is claimed is:

1. A crosslinkable composition comprising:
a) a polymeric material of Formula (I)

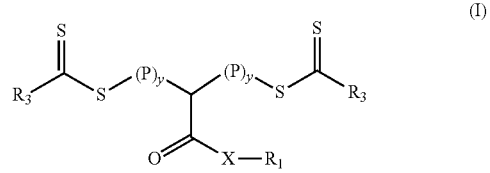

wherein
$R_1$ is hydrogen, alkyl, fluorinated alkyl, aryl, aralkyl, or substituted aryl;
X is oxy or —$NR_2$— where group $R_2$ is hydrogen, alkyl, fluorinated alkyl, aryl, aralkyl, or substituted aryl;
each $R_3$ is an alkoxy, fluorinated alkoxy, or —$N(R_4)_2$ where each $R_4$ is an alkyl, fluorinated alkyl, or together with the nitrogen to which they are both attached form a heterocyclic ring;
each P is a polymeric block that comprises a polymerized product of a first monomer composition comprising at least one monomer having a single ethylenically unsaturated group;
y is an integer in a range of 1 to 5; and
b) a second monomer composition that is miscible with the polymeric material of Formula (I), the second monomer composition comprising a crosslinking monomer having at least two ethylenically unsaturated groups.

2. The crosslinkable composition of claim 1, wherein y is equal to 1 and the polymeric material of Formula (I) is an elastomeric material.

3. The crosslinkable composition of claim 1, wherein the crosslinkable composition comprises 5 to 99.99 weight percent polymeric material of Formula (I), 0.01 to 20 weight percent crosslinking monomer having at least two ethylenically unsaturated groups, and 2) 0 to 95 weight percent monomer having a single ethylenically unsaturated group, wherein each amount is based on a total weight of polymerized and polymerizable material.

4. The crosslinkable composition of claim 1, wherein the polymeric material of Formula (I) has a weight average molecular weight in a range of 10,000 Daltons to 5 million Daltons.

5. The crosslinkable composition of claim 1, wherein the crosslinkable composition further comprises a photoinitiator.

6. The crosslinkable composition of claim 5, wherein the photoinitiator is of Formula (V)

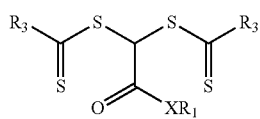 (V)

wherein
- $R_1$ is hydrogen, alkyl, fluorinated alkyl, aryl, aralkyl, or substituted aryl;
- X is oxy or —$NR_2$— where group $R_2$ is hydrogen, alkyl, fluorinated alkyl, aryl, aralkyl, or substituted aryl;
- each $R_3$ is an alkoxy, fluorinated alkoxy, or —$N(R_4)_2$ where each $R_4$ is an alkyl, fluorinated alkyl, or together with the nitrogen to which they are both attached form a heterocyclic ring.

7. The crosslinkable composition of claim 5, wherein the photoinitiator is not of Formula (V).

8. The crosslinkable composition of claim 1, wherein the crosslinking monomer has two or more (meth)acryloyl groups.

9. A crosslinked composition comprising the polymerized product of a crosslinkable composition of claim 1.

10. The crosslinked composition of claim 9, wherein the crosslinked composition further comprises a tackifier.

11. The crosslinked composition of claim 9, wherein the crosslinked composition is a pressure-sensitive adhesive composition.

12. An article comprising:
a first substrate; and
a crosslinked composition layer positioned adjacent to the first substrate, the crosslinked composition layer comprising the crosslinked composition of claim 9.

13. A method of making an article, the method comprising:
providing a first substrate;
applying a crosslinkable composition layer adjacent to the substrate, the crosslinkable composition layer comprising the crosslinkable composition of claim 1;
exposing the crosslinkable composition layer to actinic radiation to form a crosslinked composition layer, wherein the actinic radiation comprises ultraviolet radiation.

14. The method of claim 13, wherein the substrate is in the form of a polymeric web.

15. The method of claim 13, wherein the actinic radiation is from a light emitting diode.

* * * * *

UNITED STATES PATENT AND TRADEMARK OFFICE
CERTIFICATE OF CORRECTION

PATENT NO.        : 10,640,686 B2
APPLICATION NO.   : 16/471630
DATED             : May 5, 2020
INVENTOR(S)       : Stephen Roscoe et al.

Page 1 of 1

It is certified that error appears in the above-identified patent and that said Letters Patent is hereby corrected as shown below:

In the Specification

Column 9
Line 4, Delete "tetralkyl" and insert -- tetraalkyl --, therefor.

Column 21
Line 13, Delete "$T_g$" and insert -- Tg --, therefor.

Column 37
Line 7, After "($M_w$)" insert -- , --.

In the Claims

Column 46
Line 30, In Claim 1, delete "or—$NR_2$—" and insert -- or —$NR_2$— --, therefor.

Column 47
Line 10, In Claim 6, after "$R_1$" delete "i".

Signed and Sealed this
Fourteenth Day of July, 2020

Andrei Iancu
*Director of the United States Patent and Trademark Office*